US008626547B2

(12) United States Patent
Hirano et al.

(10) Patent No.: US 8,626,547 B2
(45) Date of Patent: Jan. 7, 2014

(54) WORK SUPPORT METHOD, WORK SUPPORT APPARATUS AND COMPUTER-READABLE STORAGE MEDIUM

(75) Inventors: Atsushi Hirano, Kawasaki (JP); Kenji Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1826 days.

(21) Appl. No.: 10/722,369

(22) Filed: Nov. 26, 2003

(65) Prior Publication Data
US 2004/0128189 A1 Jul. 1, 2004

(30) Foreign Application Priority Data

Nov. 29, 2002 (JP) ................... 2002-347985

(51) Int. Cl.
*G06Q 10/00* (2012.01)
(52) U.S. Cl.
USPC ....... 705/7.14; 705/7.11; 705/7.12; 705/7.16; 705/7.17; 705/7.22
(58) Field of Classification Search
USPC ...................... 705/9, 11, 7.11–7.42
See application file for complete search history.

(56) References Cited

U.S. PATENT DOCUMENTS

| | | | | | |
|---|---|---|---|---|---|
| 5,117,353 | A | * | 5/1992 | Stipanovich et al. | 705/7.14 |
| 5,164,897 | A | * | 11/1992 | Clark et al. | 705/321 |
| 5,416,694 | A | * | 5/1995 | Parrish et al. | 705/7.14 |
| 5,737,728 | A | * | 4/1998 | Sisley et al. | 705/7.16 |
| 5,918,207 | A | * | 6/1999 | McGovern et al. | 705/321 |
| 5,963,911 | A | * | 10/1999 | Walker et al. | 705/7.12 |
| 6,049,776 | A | * | 4/2000 | Donnelly et al. | 705/7.14 |
| 6,266,659 | B1 | * | 7/2001 | Nadkarni | 705/7.14 |
| 6,275,812 | B1 | * | 8/2001 | Haq et al. | 705/7.14 |
| 6,301,573 | B1 | * | 10/2001 | McIlwaine et al. | 706/61 |
| 6,438,353 | B1 | * | 8/2002 | Casey-Cholakis et al. | 434/350 |
| 6,578,005 | B1 | * | 6/2003 | Lesaint et al. | 705/7.14 |
| 6,850,895 | B2 | * | 2/2005 | Brodersen et al. | 705/7.14 |

(Continued)

FOREIGN PATENT DOCUMENTS

| | | |
|---|---|---|
| JP | 10-261122 | 9/1998 |
| JP | 2002-041639 A | 2/2002 |

(Continued)

OTHER PUBLICATIONS

Michael P. Hottenstein and Sherry A. Bowman; "Cross-Training and Worker Flexibility: A Review of DRC System Research"; The Journal of High Technology Management Research, vol. 9, No. 2, pp. 157-174 Copyright 1998 by JAI Press Inc.*

(Continued)

*Primary Examiner* — Beth V. Boswell
*Assistant Examiner* — Alan S Miller
(74) *Attorney, Agent, or Firm* — Fujitsu Patent Center

(57) ABSTRACT

A work support method is adapted to a work support apparatus having a skill information storage section to store skill information of workers, a work item information storage section to store work item information with respect to a work, and a work information storage section to store worker information of each work item with respect to the work. The work support method extracts a worker corresponding to each work item by referring to the skill information storage section and storing the extracted worker in the work information storage section, with respect to each work item stored in the work item information storage section, in response to a work order.

11 Claims, 33 Drawing Sheets

(56) References Cited

U.S. PATENT DOCUMENTS

| | | | |
|---|---|---|---|
| 6,859,523 B1* | 2/2005 | Jilk et al. | 379/32.01 |
| 6,938,048 B1* | 8/2005 | Jilk et al. | 705/7.14 |
| 7,035,808 B1* | 4/2006 | Ford | 705/7.14 |
| 7,054,821 B1* | 5/2006 | Rosenthal et al. | 705/348 |
| 7,155,400 B1* | 12/2006 | Jilk et al. | 705/7.14 |
| 7,181,413 B2* | 2/2007 | Hadden et al. | 705/7.42 |
| 7,346,542 B2* | 3/2008 | Suzuki | 705/7.42 |
| 7,502,748 B1* | 3/2009 | Baldwin et al. | 705/7.14 |
| 2002/0052773 A1* | 5/2002 | Kraemer et al. | 705/9 |
| 2002/0133389 A1* | 9/2002 | Sinex | 705/9 |
| 2003/0130820 A1* | 7/2003 | Lane, III | 702/184 |
| 2004/0088177 A1* | 5/2004 | Travis et al. | 705/1 |
| 2004/0128189 A1* | 7/2004 | Hirano et al. | 705/11 |
| 2005/0267934 A1* | 12/2005 | Brown et al. | 709/203 |

FOREIGN PATENT DOCUMENTS

| | | |
|---|---|---|
| JP | 2002-092371 A | 3/2002 |
| JP | 2002-109161 A | 4/2002 |
| JP | 2002-203055 A | 7/2002 |
| JP | 2002-230274 A | 8/2002 |
| JP | 2002-30449 A | 10/2002 |

OTHER PUBLICATIONS

Fred Glover and Claude McMillan; "The General Employee Scheduling Problem: An Integration of MS and AI"; Comput. & Ops. Res. vol. 13, No. 5, pp. 563-573, 1986.*

Michael Kremer; "The O-Ring Theory of Economic Development"; The Quarterly Journal of Economics, vol. 108, No. 3 (Aug. 1993), pp. 551-575.*

Ueda, Haruyasu, and Johan Montelius. "Dynamic scheduling in an implicit parallel system." Ninth International Conference on Parallel and Distributed Computing Systems. 1996.*

Japan Patent Office; Office Action mailed Jun. 20 2006 in connection with correspondent JP patent application 2002-347985. Partial English-language translation.

* cited by examiner

FIG.1
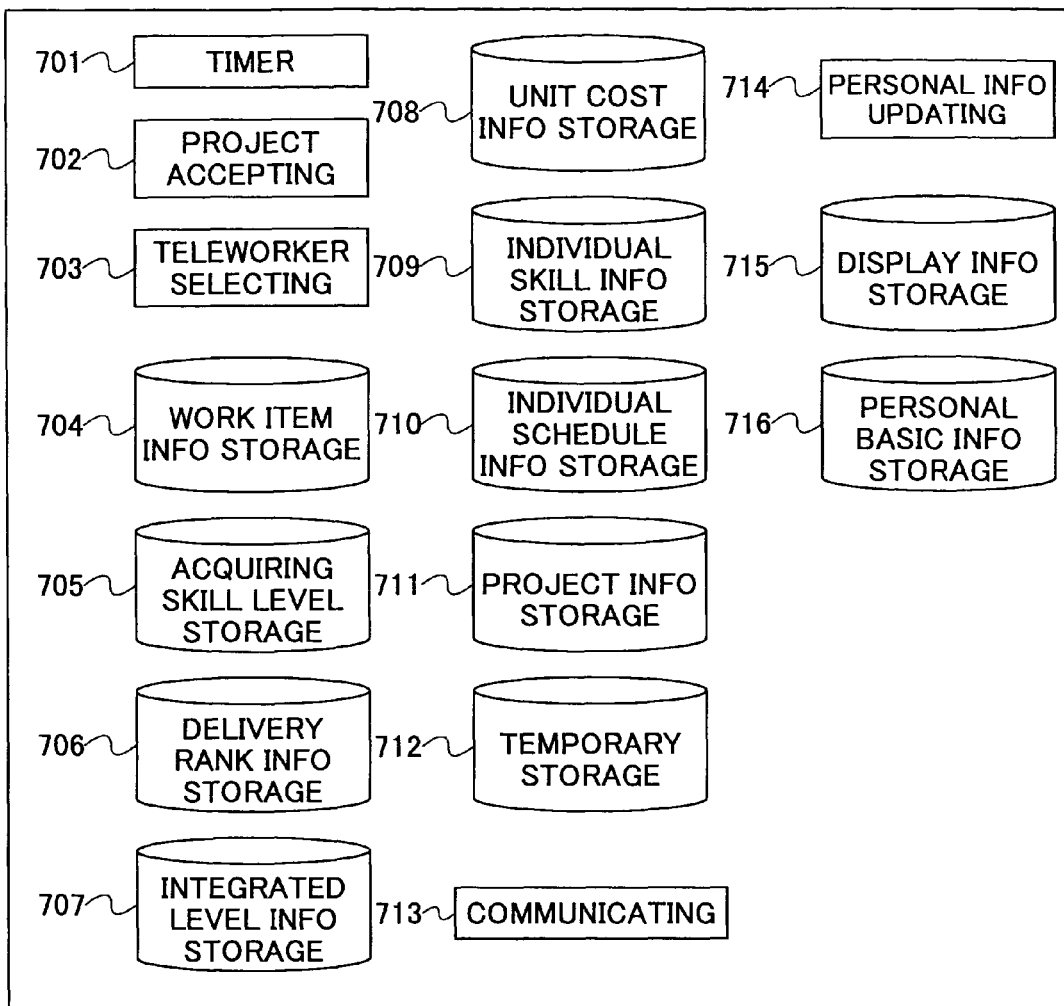
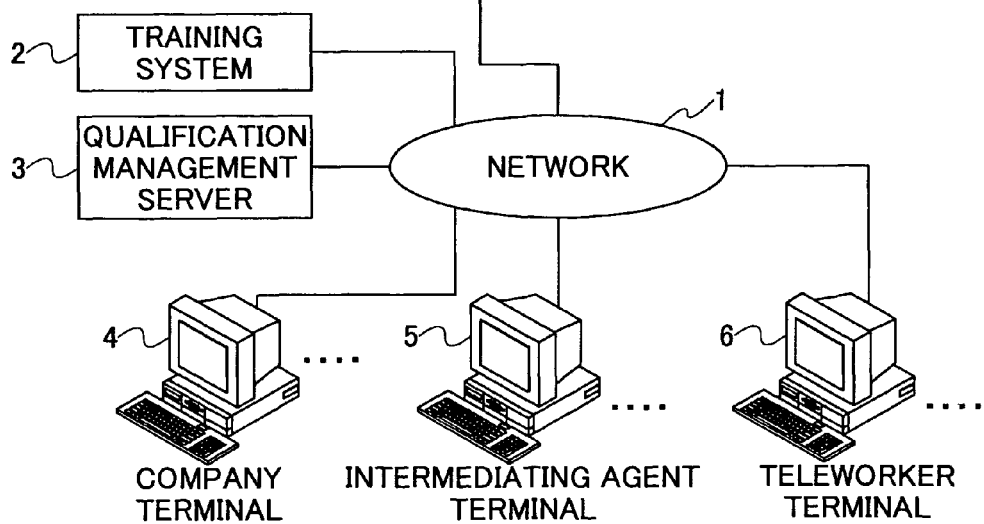

FIG.2

| WORK ITEM | BASIC WORK ORDER | PROCESSING CONDITION | REFERENCE PROCESSING TIME |
|---|---|---|---|
| CREATION OF ENTIRE STRUCTURAL DIAGRAM | 1 | | 6 DAYS |
| CREATION OF INTERFACE DESIGN SPECIFICATION | 2 | SIMULTANEOUSLY WORKING ON WORK 1 POSSIBLE | 6 DAYS |
| CREATION OF DIRECTORY STRUCTURAL DIAGRAM | 3 | WORKING POSSIBLE AFTER PROCESSING OF WORK 1 COMPLETED | 3 DAYS |
| CREATION OF SCREEN TRANSITION DIAGRAM | 4 | WORKING POSSIBLE AFTER PROCESSING OF WORK 3 | 4 DAYS |
| CREATION OF TECHNICAL SPECIFICATION | 5 | SIMULTANEOUSLY WORKING ON WORK 1 POSSIBLE | 3 DAYS |
| CREATION OF MATERIAL SPECIFICATION | 6 | SIMULTANEOUSLY WORKING ON WORK 1 POSSIBLE | 4 DAYS |

FIG.3

| WORK ITEM | CREATION OF SCREEN TRANSITION DIAGRAM |
| WORK ITEM | CREATION OF INTERFACE DESIGN SPECIFICATION |
| WORK ITEM | CREATION OF ENTIRE STRUCTURAL DIAGRAM |

| TECHNICAL SKILL LEVEL | SUMMARY | LEVEL ACHIEVEMENT REFERENCE (ACHIEVE ANY ONE) |
|---|---|---|
| 5 | CAPABLE OF STUDYING ADVANCED HOMEPAGE USING OBJECT-ORIENTED LANGUAGE | • LEVEL-1 HOMEPAGE CREATING LICENSE<br>• CUSTOMER EVALUATION A: 15 TIMES & A-EVALUATION RATE OVER 60% |
| 4 | CAPABLE OF STUDYING ADVANCED HOMEPAGE USING OBJECT-ORIENTED LANGUAGE | • LEVEL-2 HOMEPAGE CREATING LICENSE<br>• CUSTOMER EVALUATION A: 10 TIMES & A-EVALUATION RATE OVER 50%<br>• COMPLETED COMPANY HOMEPAGE TRAINING (ADVANCED COURSE) |
| 3 | CAPABLE OF CREATING HOMEPAGE HAVING PLURAL LINKED SCREENS WITHOUT RELYING ON HOMEPAGE CREATING TOOL | • LEVEL-3 HOMEPAGE CREATING LICENSE<br>• CUSTOMER EVALUATION A: 5 TIMES<br>• COMPLETED COMPANY HOMEPAGE TRAINING (INTERMEDIATE COURSE) |
| 2 | CAPABLE OF CREATING HOMEPAGE HAVING PLURAL LINKED SCREENS USING HOMEPAGE CREATING TOOL | • LEVEL-4 HOMEPAGE CREATING LICENSE<br>• HOMEPAGE DESIGN SPECIFICATION CREATION EXPERIENCE 10 TIMES<br>• COMPLETED COMPANY HOMEPAGE TRAINING (BEGINNER COURSE) |
| 1 | | |

FIG.4

| WORK ITEM | CREATION OF SCREEN TRANSITION DIAGRAM |
|---|---|
| WORK ITEM | CREATION OF INTERFACE DESIGN SPECIFICATION |

301 / 302

| DELIVERY RANK | DELIVERY RANK REFERENCE |
|---|---|
| 5 | ・PAST 10 DELIVERY MEETING PERCENTAGE IS 100%<br>・EARLY DELIVERY: PROBABILITY OVER 90%<br>　AT [REFERENCE PROCESSING TIME (DAYS)]−(3 DAYS),<br>・OVER 50 CREATIONS<br><br>ALL APPLY |
| 4 | ・PAST 10 DELIVERY MEETING PERCENTAGE IS 100%,<br>・EARLY DELIVERY: PROBABILITY OVER 90%<br>　AT [REFERENCE PROCESSING TIME (DAYS)]−(2 DAYS)<br>・OVER 30 CREATIONS<br><br>ALL APPLY |
| 3 | ・PAST 10 DELIVERY MEETING PERCENTAGE IS OVER 90%,<br>・NO DELIVERY DELAYS OF OVER 10 DAYS FOR PAST 10 DELAYS<br>・EARLY DELIVERY: PROBABILITY OVER 90%<br>　AT [REFERENCE PROCESSING TIME (DAYS)]−(1 DAYS)<br>・OVER 11 CREATIONS<br><br>ALL APPLY |
| 2 | ・PAST 10 DELIVERY MEETING PERCENTAGE IS OVER 40% & UNDER 90%<br>・DELIVERY DELAYS OF OVER 10 DAYS FOR PAST 10 DELAYS ARE OVER 0% & UNDER 20%<br>・5 TO 10 CREATIONS<br><br>ANY APPLIES |
| 1 | ・PAST 10 DELIVERY MEETING PERCENTAGE IS UNDER 40%<br>・DELIVERY DELAYS OF OVER 10 DAYS FOR PAST 10 DELAYS ARE OVER 20%<br>・UNDER 5 CREATIONS<br><br>ANY APPLIES |

(Header row above table: WORK ITEM | CREATION OF ENTIRE STRUCTURAL DIAGRAM)

FIG.5

| DELIVERY RANK \ TECHNICAL SKILL LEVEL | 1 | 2 | 3 | 4 | 5 |
|---|---|---|---|---|---|
| 1 | 1 | 1 | 2 | 2 | 3 |
| 2 | 1 | 2 | 2 | 3 | 3 |
| 3 | 2 | 2 | 3 | 4 | 4 |
| 4 | 2 | 3 | 3 | 4 | 4 |
| 5 | 2 | 3 | 4 | 4 | 5 |

FIG.6

| INTEGRATED LEVEL | UNIT PRICE |
|---|---|
| 1 | 20000YENS |
| 2 | 15000YENS |
| 3 | 12000YENS |
| 4 | 10000YENS |
| 5 | 8000YENS |

FIG.7

| PROJECT UNIT | DIRECTOR | |
|---|---|---|
| WORK ITEM | CREATION OF ENTIRE STRUCTURAL DIAGRAM | |
| 601 INTEGRATED LEVEL | 3 | |
| 602 ANTICIPATED DATA INFO | 2003/05/12 | |

603 WORK HISTORY INFO

| PROCESSED DATE | CUSTOMER | DELIVERY | EVALUATION | EARLY DELIVERY |
|---|---|---|---|---|
| 99/07 | △△ CORPORATION | O.K. | A | 0 |
| 01/02 | ○X COMPANY | +1 | A | 0 |
| 02/04 | △○ HOTEL | O.K. | B | −5 |

604 QUALIFICATION INFO

| 99/10 | LEVEL-3 HOMEPAGE CREATING LICENSE |
|---|---|

605 TRAINING INFO (COMPLETED)

| 01/12 | COMPLETED COMPANY HOMEPAGE TRAINING (INTERMEDIATE COURSE) |
|---|---|

606 TRAINING INFO (RECEIVING)

FIG.8

| SPECIFIED HOLIDAY INFO | | | ~801 |
|---|---|---|---|
| 02/11/23 <br> 03/02/01 | | | |

| WORK SCHEDULE PLAN INFO | | | ~802 |
|---|---|---|---|
| DURATION | CUSTOMER | WORK CATEGORY/ WORK ITEM | |
| 02/12/01 ~ 02/12/06 | OX COMPANY | DIRECTOR INTERFACE DESIGN | |
| 02/12/08 ~ 02/12/12 | X△COMPANY LTD. | DIRECTOR ICON CREATION | |
| 03/01/08 ~ 03/01/12 | XX TELEVISION BROADCASTING | DESIGNER | |
| 03/01/20 ~ | OO COMPANY | | |

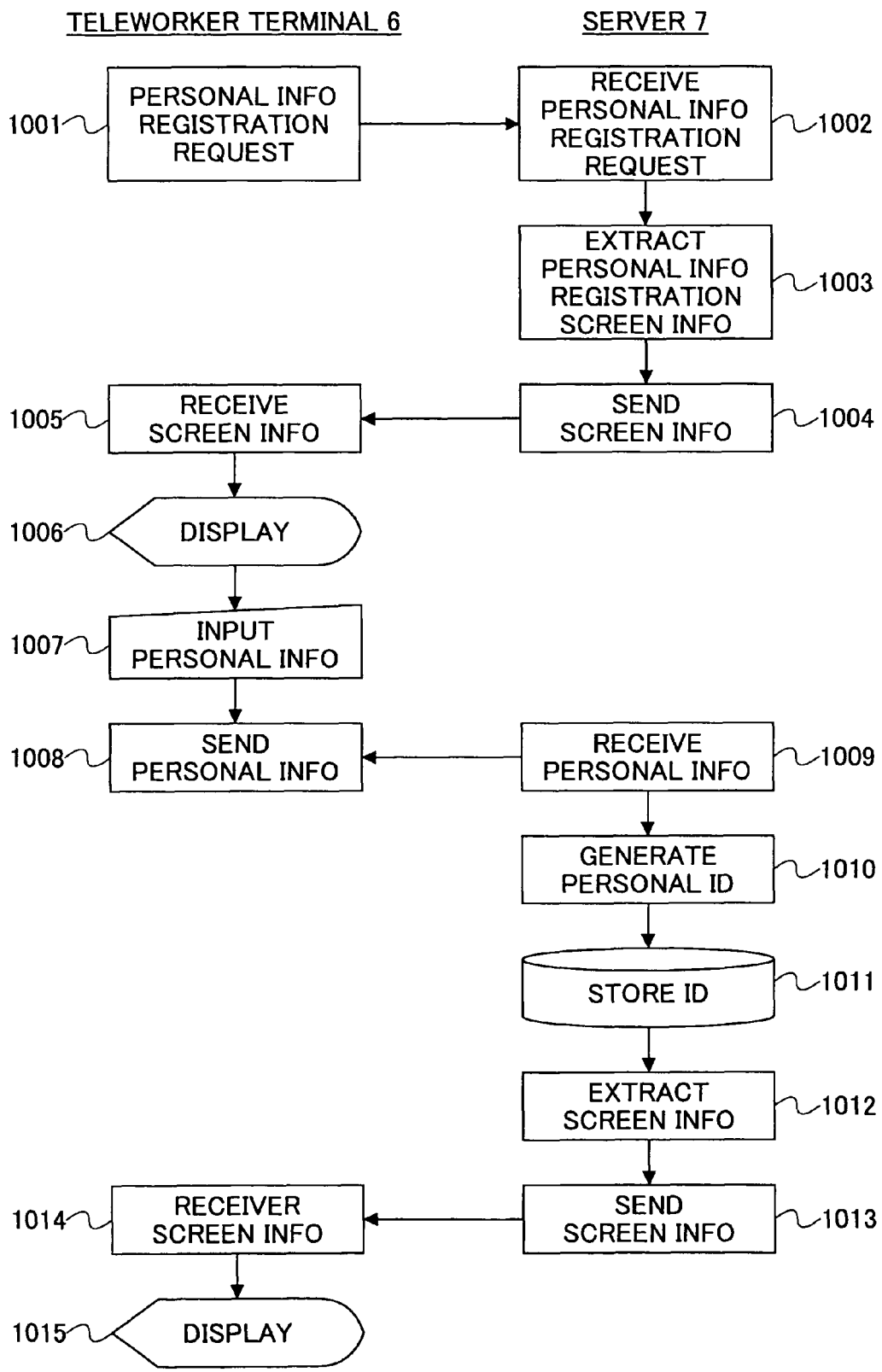

FIG.10A

| PERSONAL INFO REGISTRATION | |
|---|---|
| NAME | |
| ADDRESS | |
| PLACE OF CONTACT(TEL) | |
| E-MAIL | |
| MEETING AT REMOTE LOCATION POSSIBLE | ○ YES   ○ NO |

(SEND)

| PERSONAL INFO REGISTRATION | |
|---|---|
| NAME | ABC DEF |
| ADDRESS | KANAGAWA, ⋯ |
| PLACE OF CONTACT(TEL) | 04*-*-** |
| E-MAIL | Pekesuke@+++.ne.jp |
| MEETING AT REMOTE LOCATION POSSIBLE | YES   ○ NO |

(SEND)

| ID | NAME | ADDRESS | TEL. NO. | E-MAIL | REMOTE LOCATION |
|---|---|---|---|---|---|
| 0109 | ABC DEF | KANAGAWA, ⋯ | 04*-*-** | Pekesuke@+++.ne.jp | O.K. |
| 0108 | BCD EFG | TOYAMA, ⋯ | 02*-○○○-○○○○ | MEy@***.ne.jp | N.G. |
| 0107 | CDE FGH | FUKUI, ⋯ | 053-XXX-XXXX | chuan@%%.co.jp | N.G. |
| 0106 | DEF GHI | AOMORI, ⋯ | 023-△△△-△△△△ | sou@/////.co.jp | O.K. |
| 0105 | EFG HIJ | FUKUOKA, ⋯ | 092-□□□-□□□□ | syou@----.co.jp | N.G. |
| 0104 | FGH IJK | HIROSHIMA, ⋯ | 082-@@@-@@@@ | hatto@3###.ne.jp | O.K. |
| 0103 | GHI JKL | AICHI, ⋯ | 044-+++-++++ | deko@&&.ne.jp | O.K. |
| 0102 | HIJ KLM | OKINAWA, ⋯ | 09*-+**-~~~~ | sqq@ | |
| 0101 | IJK LMN | TOKYO, ⋯ | | | |

| QUALIFICATION INFO REGISTRATION | |
|---|---|
| ID | |
| QUALIFICATION INFO | |

904

(SEND)

FIG.14B

| QUALIFICATION INFO REGISTRATION | |
|---|---|
| ID | 0109 |
| QUALIFICATION INFO | LEVEL-3 HOMEPAGE CREATING LICENSE |

905

(SEND)

FIG.18

| PROJECT UNIT | DIRECTOR |
|---|---|
| WORK ITEM | CREATION OF ENTIRE STRUCTURAL DIAGRAM |
| 601 — INTEGRATED LEVEL | 3 |
| 602 — ANTICIPATED DATA INFO | 02/04/20 |

603 — WORK HISTORY INFO

| PROCESSED DATE | CUSTOMER | DELIVERY | EVALUATION | EARLY DELIVERY |
|---|---|---|---|---|
| 99/07 | △△ CORPORATION | O.K. | A | 0 |
| 01/02 | OX COMPANY | +1 | A | 0 |
| 02/04 | △O HOTEL | O.K. | B | -5 |

604 — QUALIFICATION INFO

| 99/10 | LEVEL-3 HOMEPAGE CREATING LICENSE |
|---|---|

605 — TRAINING INFO (COMPLETED)

| 01/12 | COMPLETED COMPANY HOMEPAGE TRAINING (INTERMEDIATE COURSE) |
|---|---|

606 — TRAINING INFO (RECEIVING)

| 02/04/20 | HOMEPAGE COMPANY TRAINING (ADVANCED COURSE) |
|---|---|

FIG.21

| PROJECT UNIT | DIRECTOR |
|---|---|
| WORK ITEM | CREATION OF ENTIRE STRUCTURAL DIAGRAM |
| 601 INTEGRATED LEVEL | 4 |
| 602 ANTICIPATED DATA INFO | |

603 WORK HISTORY INFO

| PROCESSED DATE | CUSTOMER | DELIVERY | EVALUATION | EARLY DELIVERY |
|---|---|---|---|---|
| 99/07 | △△ CORPORATION | O.K. | A | 0 |
| 01/02 | OX COMPANY | +1 | A | 0 |
| 02/04 | △O HOTEL | O.K. | B | -5 |

604 QUALIFICATION INFO

| 99/10 | LEVEL-3 HOMEPAGE CREATING LICENSE |
|---|---|

605 TRAINING INFO (COMPLETED)

| 02/13 | COMPLETED COMPANY HOMEPAGE TRAINING (ADVANCED COURSE) |
|---|---|

606 TRAINING INFO (RECEIVING)

FIG.24A

ORDERING SCREEN

| COMPANY ID | |
|---|---|
| PROJECT NAME | |
| (1) DESIRED DELIVERY DATE | |
| (2) DESIRED PRICE | |
| PRIORITY ORDER | |
| USE OF BACKUP | ○ YES    ○ NO |

(NOTE) A 20% additional charge is made with respect to the above price when backup is used.

(SEND)

ORDERING SCREEN

| COMPANY ID | OX SHOP |
|---|---|
| PROJECT NAME | OX SHOP SALES HOMEPAGE CREATION |
| (1) DESIRED DELIVERY DATE | 2003/05/03 |
| (2) DESIRED PRICE | 1,000,000 YENS |
| PRIORITY ORDER | (1)→(2) |
| USE OF BACKUP | ● YES    ○ NO |

(NOTE) A 20% additional charge is made with respect to the above price when backup is used.

(SEND)

| WORK ITEM | TELEWORKER ID | BACKUP TELEWORKER | PROCESSING TIME |
|---|---|---|---|
| CREATION OF ENTIRE STRUCTURAL DIAGRAM | 0109 | | 2003/02/10 TO 2003/02/15 |
| CREATION OF INTERFACE DESIGN SPECIFICATION | 0100 | | 2003/02/11 TO 2003/02/16 |
| CREATION OF DIRECTORY STRUCTURAL DIAGRAM | 0003 | | 2003/02/16 TO 2003/02/18 |
| CREATION OF SCREEN TRANSITION DIAGRAM | 0044 | | 2003/02/19 TO 2003/02/22 |
| CREATION OF TECHNICAL SPECIFICATION | 0078 | | 2003/02/23 TO 2003/02/25 |
| CREATION OF MATERIAL SPECIFICATION | 0078 | | 2003/02/26 TO 2003/03/01 |

FIG.28

| WORK ORDER | |
|---|---|
| COMPANY | OX SHOP |
| PROJECT NAME | OX SHOP SALES HOMEPAGE CREATION |
| WORK DURATION | 2003/02/10 TO 2003/02/15 |

Will you accept the work order?

YES   NO

| | | 1202 1210 1203 1220 1204 1230 |
|---|---|---|

| PROJECT | | PROGRAMMER | |
|---|---|---|---|
| 1201 PROJECT | | DESIGNER | |
| PROJECT | | DIRECTOR | |
| WORK ITEM | TELEWORKER ID | BACKUP TELEWORKER | PROCESSING TIME |
| CREATION OF ENTIRE STRUCTURAL DIAGRAM | 0109 | 0102 | 2003/02/10 TO 2003/02/15 |
| CREATION OF INTERFACE DESIGN SPECIFICATION | 0100 | 0002 | 2003/02/11 TO 2003/02/16 |
| CREATION OF DIRECTORY STRUCTURAL DIAGRAM | 0003 | 0019 | 2003/02/16 TO 2003/02/18 |
| CREATION OF SCREEN TRANSITION DIAGRAM | 0044 | 0106 | 2003/02/19 TO 2003/02/22 |
| CREATION OF TECHNICAL SPECIFICATION | 0078 | 0031 | 2003/02/23 TO 2003/02/25 |
| CREATION OF MATERIAL SPECIFICATION | 0078 | 0099 | 2003/02/26 TO 2003/03/01 |

FIG.32

TOTAL WORK TIME:
          2003/02/10 TO 2003/04/10
TOTAL PRICE: 9,300,000 YENS
BACKUP PRICE: 1,860,000 YENS

EXECUTE    CANCEL

| PROJECT | DIRECTOR | WORK ITEM | CREATION OF ENTIRE STRUCTURAL DIAGRAM |
|---------|----------|-----------|---------------------------------------|
| TELEWORKER | BACKUP TELEWORKER | PROCESSING TIME | |
| ABC DEF | GHI JKL | 2003/02/10 TO 2003/02/15 | |

INTEGRATED LEVEL: 3
TECHNICAL SKILL LEVEL: 3
DELIVERY RANK: 3

WORK SUPPORT METHOD, WORK SUPPORT APPARATUS AND COMPUTER-READABLE STORAGE MEDIUM

This application claims the benefit of a Japanese Patent Application No. 2002-347985 filed Nov. 29, 2002, in the Japanese Patent Office, the disclosure of which is hereby incorporated by reference.

BACKGROUND OF THE INVENTION

1. Field of the Invention

The present invention generally relates to work support methods, work support apparatuses and computer-readable storage media, and more particularly to a work support method suited for assigning work, a work support apparatus which employs such a work support method, and a computer-readable storage medium which stores a program for causing a computer to carry out such a work support method.

2. Description of the Related Art

Conventionally, the work assignment for a certain work is made by assigning each worker based on job time information which is obtained from skill factors including proficiency and capacity of each worker, as proposed in a Japanese Laid-Open Patent Application No. 10-261122, for example.

In a case where the worker is an employee, the skill management of the employee can be made accurately by holding training seminars within the employer company, receiving reports on qualifications obtained by the employee, and the like. In addition, it is to a certain extent possible to grasp the personality of the employee. Hence, it is possible to easily convert such information into numerical values and manage the numerical values.

However, the work format or environment is changing. Instead of the employee commuting to an employer company and doing the work, the work may be done by people called "teleworkers". The teleworker is not an employee of a company but do the work for this company by receiving an order from this company directly or indirectly via an intermediating agent or the like.

The teleworker is basically not an employee of a company. For this reason, it is difficult to obtain accurate proficiency information of the teleworker and manage the proficiency information in the form of numerical values. For example, the proficiency information of the teleworker is based on information submitted by the teleworker himself to the intermediating agent or, is determined by the intermediating agent based on a work history of the teleworker with respect to the work assigned to the teleworker in the past by the intermediating agent. The work assignment to the teleworker must be made based on such proficiency information which may not always be accurate.

The work assigned to the teleworker is made based on a work contract signed between the company that places the order and the individual teleworker who receives the order. Hence, it is generally considered that the reliability of the work with regard to the quality and time limit of delivery is poorer compared to the case where the company places the order to the employee thereof or to another company. As a result, there is a tendency not to place the order of important work to the teleworker, thereby accounting for one of the reasons the work orders to the teleworkers are not increasing.

SUMMARY OF THE INVENTION

Accordingly, it is a general object of the present invention to provide a novel and useful work support method, work support apparatus and computer-readable storage medium, in which the problems described above are eliminated.

Another and more specific object of the present invention is to provide a work support method, a work support apparatus and a computer-readable storage medium, which output support information related to work assignment when work order information is received, based on the work order information and skill information of individuals which is successively stored and updated, so that a manager who manages the work order can make a suitable work assignment.

Still another specific object of the present invention is to provide a work support method, a work support apparatus and a computer-readable storage medium, which manage work contents and showings of past work of each of teleworkers, and a history of trainings received by each of the teleworkers, and also manage schedules of the teleworkers so as to improve reliability of the work performed by the teleworkers.

A further object of the present invention is to provide a work support method comprising storing skill information of workers in a skill information storage section; storing work item information with respect to a work in a work item information storage section; storing worker information of each work item with respect to the work in a work information storage section; and extracting a worker corresponding to each work item by referring to the skill information storage section and storing the extracted worker in the work information storage section, with respect to each work item stored in the work item information storage section, in response to a work order. According to the work support method of the present invention, it is possible to output support information related to work assignment when work order information is received, based on the work order information and skill information of individuals which is successively stored and updated, so that a manager who manages the work order can make a suitable work assignment. In addition, it is possible to manage work contents and showings of past work of each worker, and a history of trainings received by each worker, and also manage schedules of each worker so as to improve reliability of the work performed by the workers.

Another object of the present invention is to provide a work support method adapted to a work support apparatus comprising a skill information storage section to store skill information of workers, a work item information storage section to store work item information with respect to a work, and a work information storage section to store worker information of each work item with respect to the work, the work support method comprising extracting a worker corresponding to each work item by referring to the skill information storage section and storing the extracted worker in the work information storage section, with respect to each work item stored in the work item information storage section, in response to a work order. According to the work support method of the present invention, it is possible to output support information related to work assignment when work order information is received, based on the work order information and skill information of individuals which is successively stored and updated, so that a manager who manages the work order can make a suitable work assignment. In addition, it is possible to manage work contents and showings of past work of each worker, and a history of trainings received by each worker, and also manage schedules of each worker so as to improve reliability of the work performed by the workers.

Still another object of the present invention is to provide a work support apparatus comprising a skill information storage section to store skill information of workers; a work item information storage section to store work item information with respect to a work; a work information storage section to store worker information of each work item with respect to the work; and a worker extracting section to extract a worker corresponding to each work item by referring to the skill information storage section and storing the extracted worker in the work information storage section, with respect to each work item stored in the work item information storage section, in response to a work order. According to the work support apparatus of the present invention, it is possible to output support information related to work assignment when work order information is received, based on the work order information and skill information of individuals which is successively stored and updated, so that a manager who manages the work order can make a suitable work assignment. In addition, it is possible to manage work contents and showings of past work of each worker, and a history of trainings received by each worker, and also manage schedules of each worker so as to improve reliability of the work performed by the workers.

A further object of the present invention is to provide a computer-readable storage medium which stores a work support program for causing a computer to carry out a work support operation, the work support program comprising a skill information storage procedure causing the computer to store skill information of workers in a skill information storage section; a work item information storage procedure causing the computer to store work item information with respect to a work in a work item information storage section; a work information storage procedure causing the computer to store worker information of each work item with respect to the work in a work information storage section; and a worker extracting procedure causing the computer to extract a worker corresponding to each work item by referring to the skill information storage section and storing the extracted worker in the work information storage section, with respect to each work item stored in the work item information storage section, in response to a work order. According to the computer-readable storage medium of the present invention, it is possible to output support information related to work assignment when work order information is received, based on the work order information and skill information of individuals which is successively stored and updated, so that a manager who manages the work order can make a suitable work assignment. In addition, it is possible to manage work contents and showings of past work of each worker, and a history of trainings received by each worker, and also manage schedules of each worker so as to improve reliability of the work performed by the workers.

Other objects and further features of the present invention will be apparent from the following detailed description when read in conjunction with the accompanying drawings.

BRIEF DESCRIPTION OF THE DRAWINGS

FIG. 1 is a diagram showing a work support system to which an embodiment of a work support method according to the present invention may be applied;

FIG. 2 is a diagram showing tables of information stored in a work item information storage section;

FIG. 3 is a diagram showing tables of information stored in an acquired skill level storage section;

FIG. 4 is a diagram showing tables of information stored in a delivery rank information storage section;

FIG. 5 is a diagram showing an integrated level table stored in an integrated level information storage section;

FIG. 6 is a diagram showing a unit price information table stored in a unit price information storage section;

FIG. 7 is a diagram showing tables of information stored in a individual skill information storage section;

FIG. 8 is a diagram showing a table of information stored in an individual schedule information storage section;

FIG. 9 is a flow chart for explaining a personal information registering process for registering personal information of a teleworker;

FIGS. 10A and 10B are diagrams showing displays of personal information registration screens;

FIG. 11 is a diagram showing a personal information table stored in a personal basic information storage section;

FIGS. 14A and 14B are diagrams showing displays of qualification information registration screens;

FIG. 18 is a diagram showing updated information stored in the individual skill information storage section;

FIG. 21 is a diagram showing updated information stored in the individual skill information storage section;

FIGS. 24A and 24B are diagrams showing displays of ordering screens for placing work order to the teleworker;

FIG. 26 is a diagram showing tables of teleworker information stored in a temporary storage section;

FIG. 28 is a diagram showing a display of a work order accepting screen on a teleworker terminal;

FIG. 31 is a diagram showing information stored in a project information storage section;

FIG. 32 is a diagram showing a display of a teleworker selection screen on an intermediating agent terminal;

DESCRIPTION OF THE PREFERRED EMBODIMENTS

Figure 12:
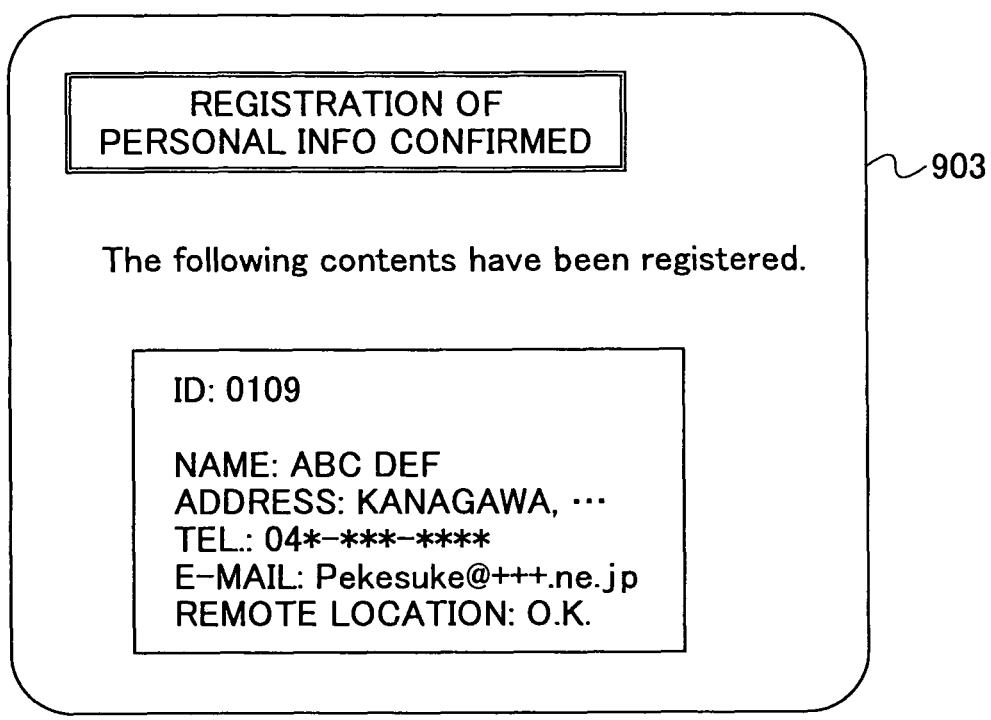
FIG. 12 is a diagram showing a display of screen information indicating completion of registration of personal information.

FIG. 1 is a diagram showing a work support system to which an embodiment of a work support method according to the present invention may be applied. This embodiment of the work support method employs an embodiment of a work support apparatus according to the present invention and an embodiment of a computer-readable storage medium according to the present invention.

In this embodiment, it is assumed for the sake of convenience that a work to be performed by a teleworker involves creating a new homepage. But of course, the work to be performed by the teleworker is not limited to the creation of the new homepage.

The work support system shown in FIG. 1 includes a training system 2, a qualification management server 3, a company terminal 4, an intermediating agent terminal 5, a teleworker terminal 6 and a server 7 which are connected via a communication network 1 such as the Internet.

Each of the training system 2, the qualification management server 3, the company terminal 4, the intermediating agent terminal 5, the teleworker terminal 6 and the server 7 may be formed by known general-purpose computers, including personal computers, provided with a processor such as a CPU and a memory and/or a storage section. The computer-readable storage medium according to the present invention stores a program for causing such a computer to function as the work support apparatus according to the present invention. The computer-readable storage medium may be formed by any recording medium suitable for storing the program, such as magnetic, optical and magneto-optical recording media and semiconductor memory devices.

The training system 2 is owned by a training company, and holds training seminars for improving skills. The training system 2 carries out a management process related to training, such as notifying completion of acceptance of training. The qualification management server 3 manages national examinations related to qualifications (or licenses) and qualification holders. The qualification management server 3 carries out a management process related to qualifications, such as accepting examination applications, notifying success or failure of the examinations, and managing qualification holders. For example, the qualification management server 3 is owned by a qualification management body or organization.

The company terminal 4 is owned by an ordering company that places a work order using a teleworker. The intermediating agent terminal 5 is owned by an intermediating agent who intermediates between the teleworker and the ordering company. The teleworker terminal 6 is owned by the teleworker.

Actually, a plurality of ordering companies, a plurality of intermediating agents and a plurality of teleworkers exist in this embodiment, and each ordering company owns one company terminal 4, each intermediating agent owns one intermediating agent terminal 5, and each teleworker owns one teleworker terminal 6. However, only one company terminal 4, one intermediating agent terminal 5 and one teleworker terminal 6 are shown in FIG. 1 for the sake of convenience.

The communication network 1 which connects the learning system 2, the servers 3 and 7, and the terminals 4, 5 and 6, may be formed by a cable network and/or a wireless network. For example, the communication network 1 may be formed by a telephone network.

The server 7 manages the teleworker work. The server 7 includes a timer section 701, a project accepting section 702, a teleworker selecting section 703, a work item information storage section 704, an acquiring skill level storage section 705, a delivery rank information storage section 706, an integrated level information storage section 707, a unit cost information storage section 708, individual skill information storage section 709, individual schedule information storage section 710, a project information storage section 711, a temporary storage section 712, a communicating section 713, a personal information updating section 714, a display information storage section 715, and a personal basic information storage section 716.

The timer section 701 provides present date and time information. The project accepting section 702 carries out a relay process which includes accepting the order from the company terminal 4 and sending the order to the intermediating agent terminal 5. The teleworker selecting section 703 selects a teleworker who suites the conditions for carrying out the project.

The work item information storage section 704 stores information related to work items generated for each work project. In this embodiment, it is assumed for the sake of convenience that the work project includes a director 100 to direct the entire framework of the homepage, a designer 110 to design the display of the homepage, and a programmer 120 to program the homepage. Each of the director 100, the designer 110 and the programmer 120 requires various work items, as shown in FIG. 2.

FIG. 2 is a diagram showing tables of information stored in the work item information storage section 704. The work item information storage section 704 stores a work item 101, a basic work order 102 for the work items, a processing condition 103 for performing each work item, and a reference processing time 104 indicating a time required to process each work item. For example, the processing condition 103 indicates that the work item can be processed only after processing another work item and/or indicates that the work item can be processed simultaneously with another work item.

The acquiring skill level storage section 705 stores the acquired skill level and reference information thereof. In this embodiment, a technical skill level 201 is set in 5 levels "1" through "5", as shown in FIG. 3. FIG. 3 is a diagram showing a table of information stored in the acquiring skill level storage section 705. As shown in FIG. 3, the table includes information related to a summary 202 of the skills required by the teleworker to reach the technical skill level 201, and a level achievement reference 203 indicating that the skills up to the technical skill level 201 has been achieved by the teleworker.

The delivery rank information storage section 706 stores rank information related to the delivery, based on a number of deliveries and a delivery deadline meeting state of each teleworker. In this embodiment, a delivery rank 301 is set in 5 ranks "1" through "5" for each work item, as shown in FIG. 4. FIG. 4 is a diagram showing tables of information stored in the delivery rank information storage section 706. As shown in FIG. 4, the table includes information related to a delivery rank reference 302 for reaching each delivery rank 301. In this embodiment, ranks up to the rank "2" of the delivery rank 301 indicates that the teleworker cannot meet the delivery deadline or, that the teleworker is inexperienced hand only has 10 or less work experiences. Further, the rank "3" or higher in the delivery rank 301 indicates that the teleworker has work experience to a certain extent, and is able meet the delivery deadline. Hence, the delivery rank reference 302 may be determined based on the above ranks of the delivery rank 301, and a judgement result indicating whether or not the teleworker is able to quickly perform the work before the delivery deadline which is used as the reference.

The integrated level information storage section 707 stores an integrated level table 401 shown in FIG. 5. FIG. 5 is a diagram showing the integrated level table 401 stored in the integrated level information storage section 707. As shown in FIG. 5, the integrated level table 401 provides a reference for calculating a unit price with respect to the teleworker, using the technical skill level 201 and the delivery rank 301 of each teleworker. For example, if the delivery rank 301 is "3" and the technical skill level 201 is "3" for a teleworker, it may be seen from the integrated level table 401 that an integrated level is "3" for this teleworker. In addition, it may also be seen from the integrated level table 401 that the integrated level remains at "3" even if the delivery rank 301 for this teleworker increases by 1 rank, but that the integrated level is improved by 1 rank if the technical skill level 201 for this teleworker increases by 1 rank.

The unit cost information storage section 708 stores a unit price information table 501 related to unit price information of each teleworker depending on the integrated level, as shown in FIG. 6. FIG. 6 is a diagram showing the unit price information table 501 stored in the unit cost information storage section 708. As shown in FIG. 6, the unit price of the teleworker increases as the integrated level of the teleworker becomes higher.

The individual skill information storage section 709 stores information related to the skills of each registered teleworker, as shown in FIG. 7. FIG. 7 is a diagram showing tables of the information stored in the individual skill information storage section 709. In this embodiment, the individual skill information storage section 709 stores skill information of each work item, with respect to each teleworker, as shown in FIG. 7. As shown in FIG. 7, the skill information includes integrated level information 601 for each work item of each teleworker, anticipated date information 602 related to an anticipated date when the integrated level will become higher due to completion of training and the like carried out thereafter for each teleworker, work history information 603 related to a history of past work of each teleworker for each work item, qualification information 604 related to qualifications obtained by each teleworker, information 605 related to training which has been received and completed with respect to each work item by each teleworker, and information 606 related to training which is presently received by each teleworker. The work history information 603 includes a processed date, customer, delivery (or delivery status), evaluation, early delivery and the like. The information 606 may include an anticipated date when the training presently received by each teleworker is anticipated to end.

The individual schedule information storage section 710 stores a work schedule of each teleworker, as shown in FIG. 8. FIG. 8 is a diagram showing a specified holiday information 801 of each teleworker specified by each teleworker, and a work schedule plan information 802 indicating a reservation state of each teleworker, which are stored in the individual schedule information storage section 710. The specified holiday information 801 and the work schedule plan information 802 are stored in the individual schedule information storage section 710 in units of teleworkers. The work schedule plan information 802 includes a duration, customer, work category and/or work item and the like.

The project information storage section 711 manages information related to each project which is accepted. The temporary storage section 712 temporarily stores information. The communicating section 713 carries out a communication via the communication network 1.

The personal information updating section 714 updates personal information of each teleworker stored in the individual skill information storage section and the individual schedule information storage section 710, and newly registers personal information of each teleworker. The display information storage section 715 stores display information to be displayed at the company terminal 4, the intermediating agent terminal 5 and the teleworker terminal 6. The personal basic information storage section 716 stores basic information of each teleworker.

Next, a description will be given of the operation of the work support system shown in FIG. 1.

[Personal Information Registration]

First, a description will be given of a personal information registering process for registering the personal information of the teleworker, by referring to FIGS. 9, 10A and 10B. FIG. 9 is a flow chart for explaining the personal information registering process, and FIGS. 10A and 10B are diagrams showing displays of personal information registration screens.

When a teleworker desires work intermediation using the work support system, it is necessary to register personal information of this teleworker with respect to the server 7, as shown in FIG. 9. In FIG. 9, it is assumed for the sake of convenience that the processes of the server 7 related to the personal information registering process are carried out by the personal information updating section 714, and that the communication is made by the communicating section 713 via the communication network 1.

First, when the teleworker operates the teleworker terminal 6 to request registration of the personal information with respect to the server 7, the teleworker terminal 6 sends a personal information registration request to the server 7 in a step 1001 shown in FIG. 9, responsive to this operation made by the teleworker.

The server 7 receives the personal information registration request in a step 1002, and extracts personal information registration screen information from the display information storage section 715 in a step 1003. The server 7 sends the extracted personal information registration screen information to the teleworker terminal 6 in a step 1004.

The teleworker terminal 6 receives the personal information registration screen information in a step 1005, and displays the personal information registration screen information in a step 1006. FIG. 10A shows a display of a personal information registration screen 901. As shown in FIG. 10A, the personal information registration screen 901 includes input fields to input information related to "name", "address", "place of contact (telephone)", and "electronic mail", an input field to input information indicating whether or not a meeting is possible at a remote location which is remote from the address registered by the teleworker, and a "send" button which is selected when sending the personal information shown in FIG. 10A to the server 7.

The teleworker inputs the personal information with respect to each item into the teleworker terminal 6 in a step 1007. For example, the personal information may be input by operating a keyboard and/or a mouse of the teleworker terminal 6. As a result, a personal information registration screen 902 shown in FIG. 10B, including the input personal information, is displayed on the teleworker terminal 6.

When the "send" button is selected on the personal information registration screen after the personal information is input, the teleworker terminal 6 detects the selection of the "send" button and sends the input personal information to the server 7 in a step 1008. For example, the "send" button may be selected by operating the mouse of the teleworker terminal 6.

The server 7 receives the personal information in a step 1009, and generates an ID corresponding to the received personal information in a step 1010. Further, the server 7 stores the ID and the received personal information as a pair in the personal basic information storage section 716 in a step 1011. The personal information which is stored in this manner into the personal basic information storage section 716 forms a personal information table 1100 shown in FIG. 11.

FIG. 11 is a diagram showing the personal information table 1100 stored in the personal basic information storage section 716. When generating the ID in the step 1010, a process is carried out so as to generate an ID which has not been issued, by referring to the stored contents of the personal basic information storage section 716.

Moreover, a table of skill information is stored in the individual skill information storage section 709 for each ID, and a table of schedule information is stored in the individual schedule information storage section 710 for each ID. In other words, the individual skill information shown in FIG. 7 is stored in the individual skill information storage section 709, and the individual schedule information shown in FIG. 8 is stored in the individual schedule information storage section 710. But in an initial registration state, no registered information exists with respect to the work history information 603, the qualification information 604, the lecture history information 605 and 606, the specified holiday information 801, and the work schedule plan information 802. The above information 603 through 606 corresponds to the individual skill information, and the information 801 and 802 corresponds to the individual schedule information.

After the process of the step 1011 is completed, the server 7 extracts screen information, indicating that the registration of the personal information is completed, from the display information storage section 715 in a step 1012. In addition, the server 7 adds the registered information to the screen information, and sends the screen information with the added registered information to the teleworker terminal 6 in a step 1013.

The teleworker terminal 6 receives the screen information with the added registered information in a step 1014, and displays the screen information with the added registered information on a screen 903 shown in FIG. 12 in a step 1015. FIG. 12 is a diagram showing a display of the screen 903 indicating completion of the registration of the personal information. As shown in FIG. 12, the screen 903 includes a message indicating that the personal information has been registered, the assigned ID and the registered information. In this case, the message portion of the screen 903 includes "Registration of Personal Information Confirmed" and "The following contents have been registered". The registered information indicated on the screen 903 includes the name, address, telephone, electronic mail, and remote location.

[Individual Qualification Information Registering Process]

The personal information described above include the ID for management use, and the personal basic information such as the name and address. Hence, the skill information related to the skill of the teleworker is not registered.

As may be seen from the skill level information shown in FIG. 7, this embodiment determines the technical skill level by referring to (i) the work history of work performed by the teleworkers in the past utilizing the work support system, (ii) the qualifications obtained by the teleworkers, and (iii) the history of trainings made in the past utilizing the work support system. The qualification information (ii) above is related to the national qualifications or the like to which the work support system is not involved. Hence, in this embodiment, the qualification information (ii) is registered by requesting registration from the teleworker himself by sending the qualification obtained by the teleworker from the teleworker terminal 6 to the server 7. When the server 7 receives the request to register the qualification information (ii), the server 7 makes an inquiry to the qualification management server 3 with respect to the qualification information (ii), so as to determine whether or not the qualification to be registered is valid. The server 7 registers the qualification information (ii) depending on a response to the inquiry, that is, an authentication result, received from the qualification management server 3.

Figure 13:
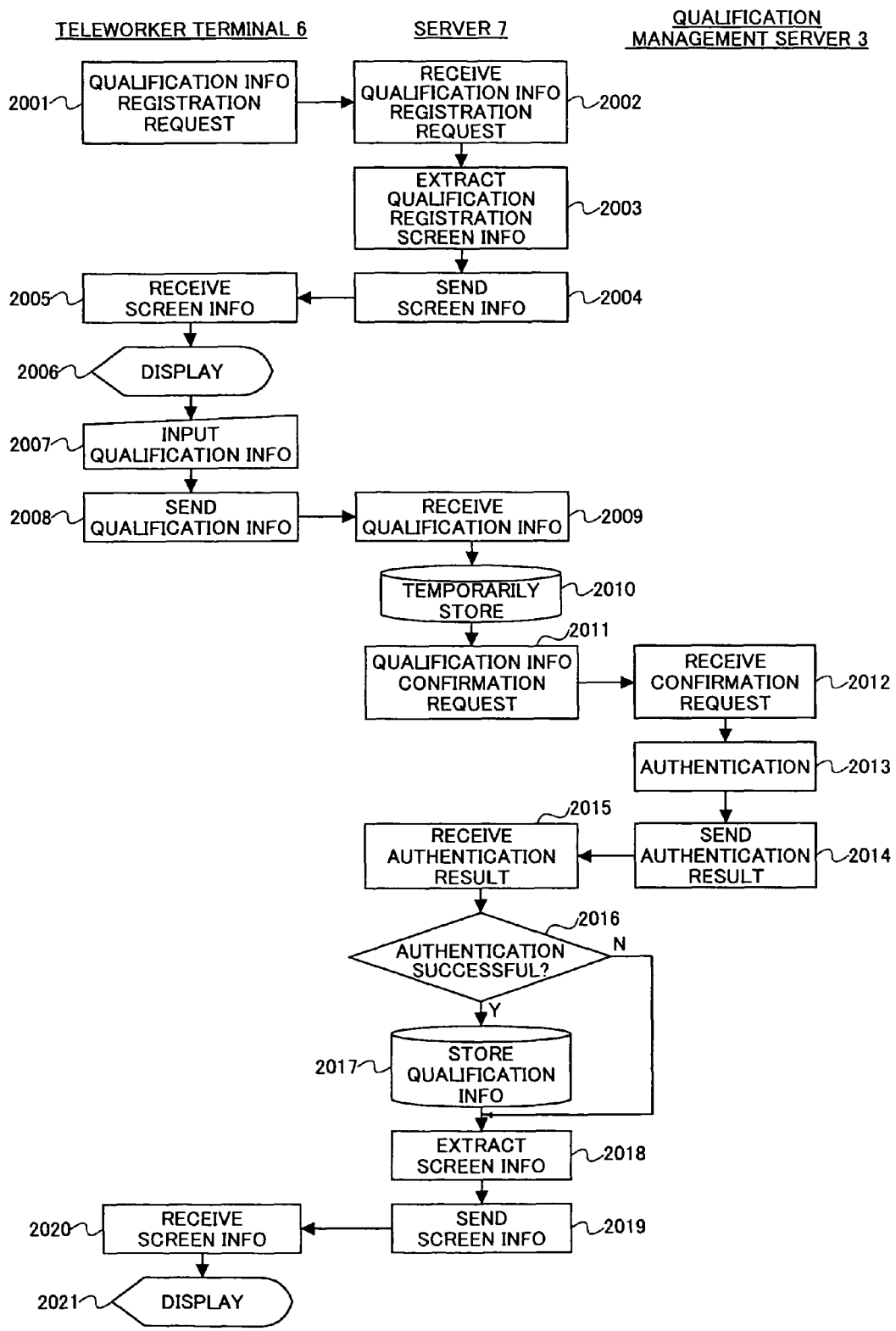
FIG. 13 is a flow chart for explaining an individual qualification registering process.

A description will be given of an individual qualification registering process, by referring to FIG. 13. FIG. 13 is a flow chart for explaining the individual qualification registering process. It is assumed for the sake of convenience that the processes of the server 7 related to the individual qualification information registering process are carried out by the personal information updating section 714, and that the communication is made by the communicating section 713 via the communication network 1.

First, the teleworker who obtained a qualification operates the teleworker terminal 6, so as to request registration of the qualification with respect to the server 7 by sending registering qualification information to the server 7 in a step 2001 shown in FIG. 13.

The server 7 receives the registering qualification information in a step 2002, and extracts a qualification registration screen information from the display information storage section 715 in a step 2003. The server 7 sends the extracted qualification registration screen information to the teleworker terminal 6 in a step 2004.

The teleworker terminal 6 receives the qualification information registration screen information in a step 2005, and displays the qualification information registration screen information in a step 2006. FIG. 14A shows a display of a qualification information registration screen 904. Since this embodiment manages the teleworker by the ID, the qualification information registration screen 904 includes input fields to input the ID and the obtained qualification, and a "send" button which is selected when sending the ID and qualification information shown in FIG. 14A to the server 7.

The teleworker inputs the ID and the qualification information into the teleworker terminal 6 in a step 2007. For example, the ID and the qualification information may be input by operating the keyboard and/or the mouse of the teleworker terminal 6. As a result, a qualification information registration screen 905 shown in FIG. 14B, including the input ID and qualification information, is displayed on the teleworker terminal 6.

When the "send" button is selected on the qualification information registration screen after the personal information is input, the teleworker terminal 6 detects the selection of the "send" button and sends the input ID and qualification information to the server 7 in a step 2008. For example, the "send" button may be selected by operating the mouse of the teleworker terminal 6.

The server 7 receives the ID and qualification information in a step 2009, and temporarily stores the received information into the temporary storage section 712 in a step 2010. Further, the server 7 forms an information pair from the personal information corresponding to the received ID and the received qualification information, by referring to the personal basic information storage section 716, and sends the information pair to the qualification management server 3, in a step 2011.

The qualification management server 3 receives the information pair in a step 2012, and carries out an authentication in a step 2013. The authentication is carried out based on the information which is related to the qualification holders and is stored in the qualification management server 3, by searching to determine whether or not the personal information is included in the stored qualification holders for the qualification indicated by the received qualification information. The qualification management server 3 sends an authentication result with respect to the qualification to be registered, to the server 7, in a step 2014.

The server 7 receives the authentication result in a step 2015, and decides whether or not the authentication result indicates that the qualification to be registered is valid in a step 2016. If the decision result in the step 2016 is YES, the server 7 registers the qualification information of the individual skill information into the individual skill information storage section 709, based on the information stored in the temporary storage section 712, in a step 2017.

As described above, the table of the individual skill information is created in units of work items for each teleworker. Hence, by referring to the acquiring skill level storage section 705, the server 7 checks whether or not to register the qualification information, with respect to each work item, and updates the qualification information and the technical skill level which is dependent on the obtained qualification, in the table of the individual skill information with respect to the necessary work item. Furthermore, the server 7 refers to the information stored in the integrated level information storage section 707, determines the integrated level depending on the updated technical skill level, and updates the integrated level in the integrated level table 401.

On the other hand, if the decision result in the step 2016 is NO or, after the step 2017, the server 7 extracts screen information, which is dependent on the authentication result, from the display information storage section 715 in a step 2018. In addition, the server 7 sends the extracted screen information to the teleworker terminal 6 in a step 2019.

Figure 15A:
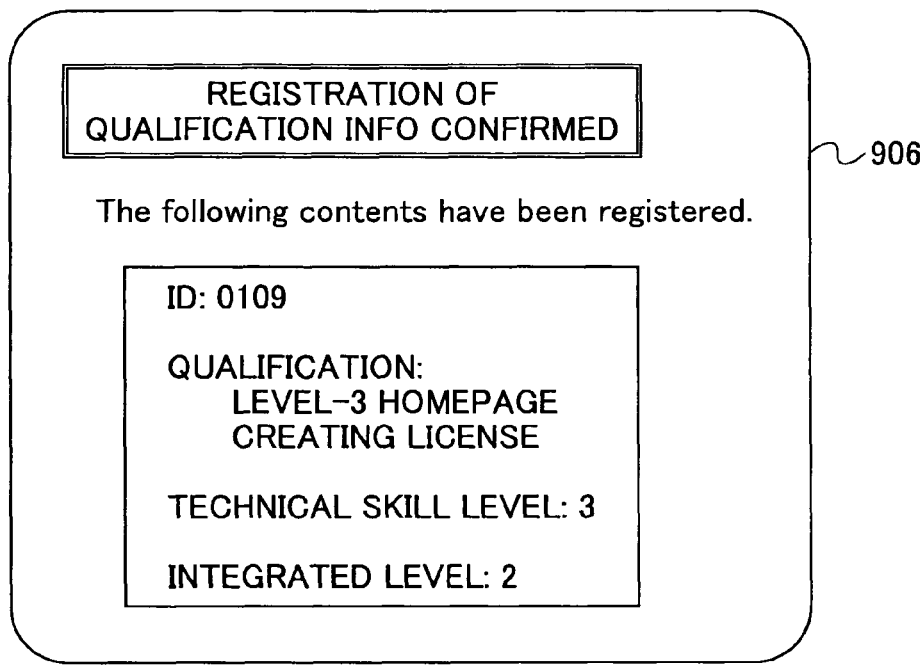
FIGS. 15A and 15B are diagrams showing displays of screens indicating an authentication result.
Figure 15B:
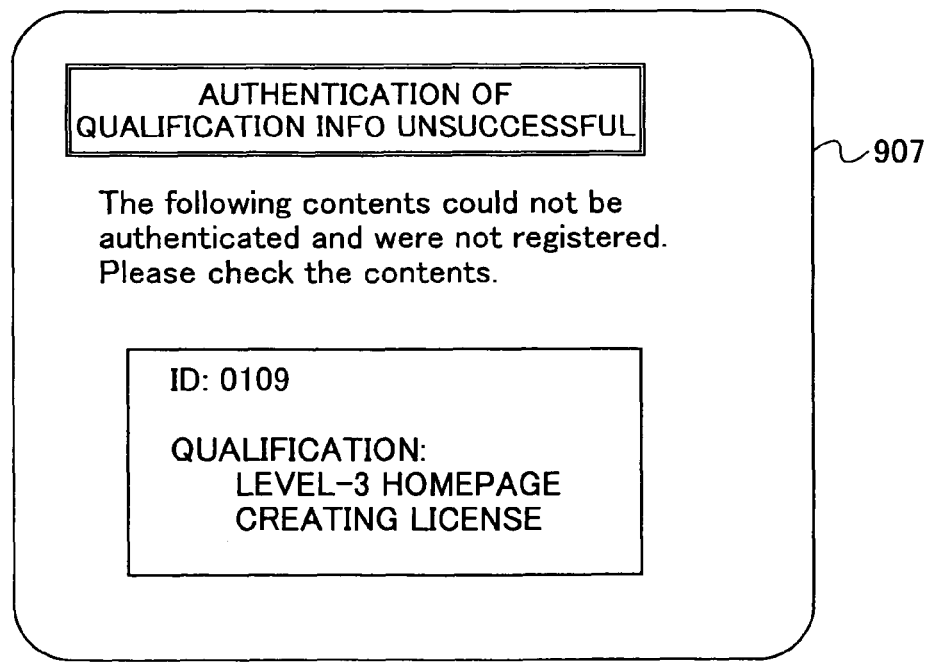

The teleworker terminal 6 receives the screen information in a step 2020, and displays the screen information on a screen 906 shown in FIG. 15A or a screen 907 shown in FIG. 15B, in a step 1015. FIG. 15A is a diagram showing the display of the screen 906 indicating that the authentication was successful, and FIG. 15B is a diagram showing the display of the screen 907 indicating that the authentication was unsuccessful.

[Training Accepting Process]

Figure 16:
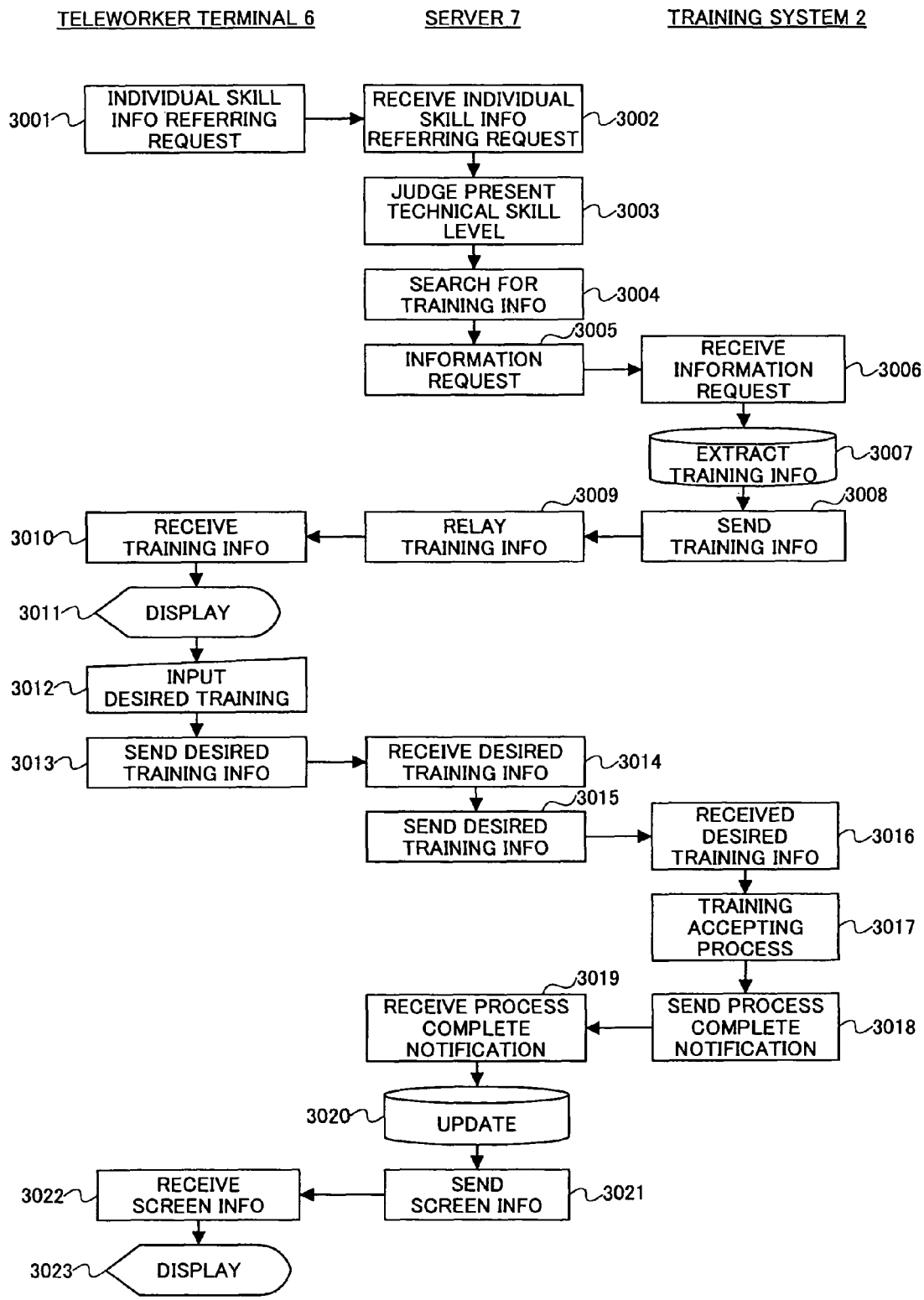
FIG. 16 is a flow chart for explaining a training accepting process.

Next, a description will be given of a training accepting process which is carried out in the work support system when the teleworker desires to receive a training managed by the work support system, by referring to FIG. 16. FIG. 16 is a flow chart for explaining the training accepting process. In FIG. 16, it is assumed for the sake of convenience that the processes of the server 7 related to the training accepting process are carried out by the personal information updating section 714, and that the communication is made by the communicating section 713 via the communication network 1.

First, when the teleworker operates the keyboard and/or the mouse of the teleworker terminal 6 and inputs an individual skill referring request with respect to a certain work item and the ID, the teleworker terminal 6 sends individual skill referring request information to the server 7 in a step 3001 shown in FIG. 16.

The server 7 receives the individual skill referring request information from the teleworker terminal 6, including the individual skill referring request and the ID, in a step 3002. Then, the server 7 judges the present technical skill level of the teleworker, in a step 3003. The present technical skill level may be judged by extracting from the individual skill information storage section 709 the individual skill information corresponding to the work item included in the individual skill referring request information, of the individual skill information corresponding to the information included in the received individual skill referring request information, and comparing the extracted individual skill information and the information stored in the acquiring skill level storage section 705. For example, if the individual skill referring request requests a work item "creation of entire structural diagram" of a "project unit: director" and the individual skill information of the teleworker is as shown in FIG. 7, the work history information 603, the qualification information 604 and the information 605 are compared with the information which is shown in FIG. 3 and stored in the acquiring skill level storage section 705. As a result, the technical skill level of the teleworker is judged to be "3" in this particular case.

Next, the server 7 refers to the acquiring skill level storage section 705 and searches for training information for achieving the technical skill level "4" which is higher than the judged technical skill level "3", in a step 3004. As shown in FIG. 3, it is found that a "homepage (HP) in-house training (expert class)" is required in order to achieve the technical skill level "4", and thus, this "HP in-house training (expert class)" is extracted.

The server 7 thereafter sends an information request for information related to the extracted training to the training system 2 of a training body or organization which actually holds the training, in a step 3005.

The training system 2 receives the information request from the server 7 in a step 3006, and extracts the information related to the extracted training in a step 3007. The information related to the extracted training may include a start time of the training, duration of the training, and vacancy for receiving the training. The training system 2 sends the information related to the extracted training to the server 7 in a step 3008.

The server 7 receives the information related to the extracted training, from the training system 2, and sends the received information to the teleworker terminal 6, in a step 3009.

Figure 17:
FIG. 17 is a diagram showing a display of a screen indicating recommended training and application for receiving training.

The teleworker terminal 6 receives the information related to the extracted training, via the server 7, in a step 3010. In addition, the teleworker terminal 6 displays a screen 908 shown in FIG. 17 based on the received information, in a step 3011. FIG. 17 is a diagram showing a display of the screen 908 indicating recommended training and application for receiving the training. In this particular case, the screen 908 includes a "receive training" button which is selected by the teleworker when the teleworker desires to receive the displayed training. When the teleworker operates the keyboard and/or the mouse of the teleworker terminal 6 and selects the desired training by selecting the "receive training" button in a step 3012, the teleworker terminal 6 sends desired training information which indicates the desired (selected) training to the server 7 in a step 3013.

The server 7 receives the desired training information from the teleworker terminal 6 in a step 3014, and transfers the desired training information to the training system 2 in a step 3015.

The training system 2 receives the desired training information transferred via the server 7, in a step 3016, and carries out a training accepting process in a step 3017. When the training accepting process is completed, the training system 2 sends a process complete notification to the server 7 in a step 3018.

The server 7 receives the process complete notification from the training system 2 in a step 3019. In addition, the server 7 updates the information (history of received training) 606 related to the corresponding individual skill information within the individual skill information storage section 709 to the accepted training information (training being received), and also updates the anticipated date information 602 to the scheduled end date of the training by referring to the integrated level information storage section 707 if the integrated level will become higher, in a step 3020. As a result, the individual skill information is updated and/or added, as shown in FIG. 18. FIG. 18 is a diagram showing the updated information stored in the individual skill information storage section 709.

In this particular case, the training is the HP in-housing training (expert class), and as shown in FIG. 18, this training information is added to update the information (history of received training) 606 related to the corresponding individual skill information, including the training being received. Further, it may also be seen from FIG. 18 that the training end date is stored in the scheduled end date when the training will be completed.

When the updating and/or adding of the information in the step 3020 is completed, the server 7 extracts from the display information storage section 715 screen information indicating that preparations for receiving the training is completed, that is, the training accepting process is completed, and sends the extracted screen information to the teleworker terminal 6, in a step 3021.

Figure 19:
FIG. 19 is a diagram showing a display of a screen indicating completion of the training accepting process.

The teleworker terminal 6 receives the screen information from the server 7 in a step 3022. Then, the teleworker terminal 6 displays the received screen information, so as to display a screen 909 shown in FIG. 19. FIG. 19 is a diagram showing a display of the screen 909 indicating the completion of the training accepting process.

Accordingly, the teleworker can easily judge whether or not to receive training for improving his technical skill level. Moreover, the server 7 can manage information which indicates the training received by the teleworker for the purposes of improving his technical skill level.

[Training Completion Process]

Figure 20:
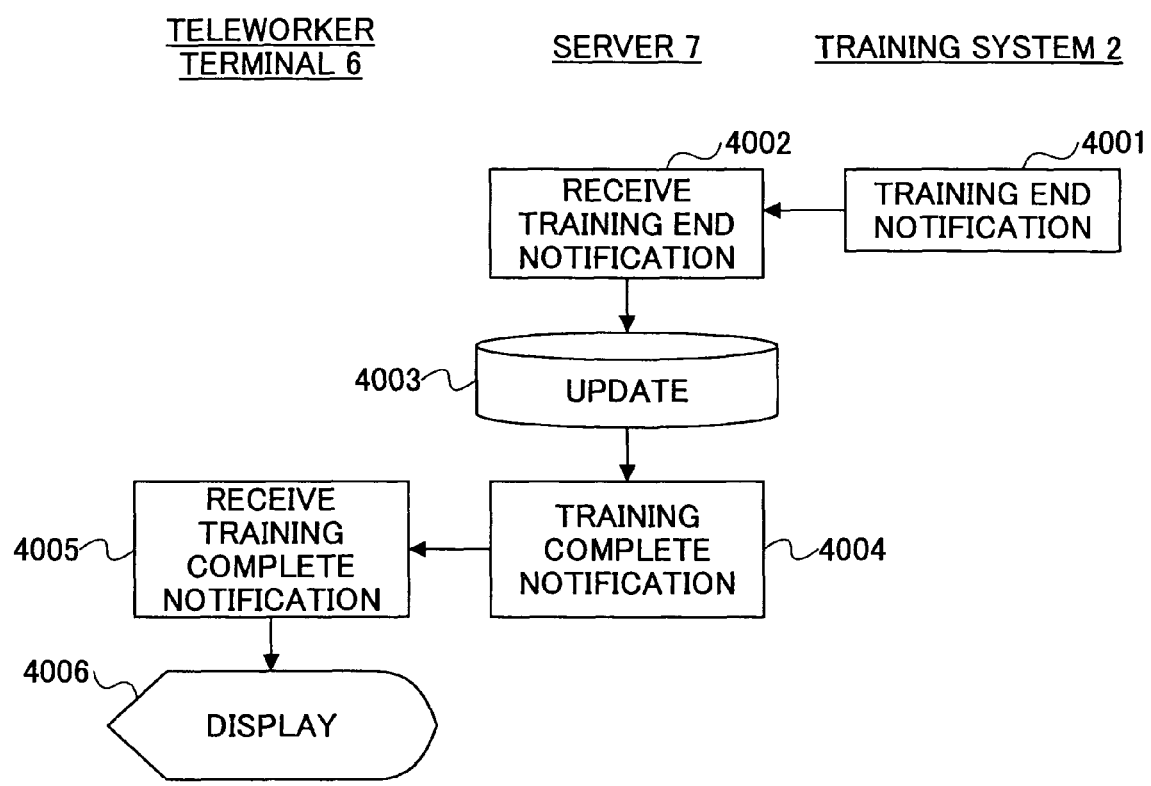
FIG. 20 is a flow chart for explaining a training completion process.

Next, a description will be given of a training completion process which is carried out by the work support system shown in FIG. 1 when the teleworker completes the training, by referring to FIG. 20. FIG. 20 is a flow chart for explaining the training completion process. It is assumed for the sake of convenience that the processes of the server 7 related to the training completion process are carried out by the personal information updating section 714, and that the communication is made by the communicating section 713 via the communication network 1.

Since the training is managed by the training body or organization, information indicating the end of the training is notified from the training system to the server 7 in a step 4001 shown in FIG. 20. The information notified from the training system includes the ID of the teleworker who received the training, and information related to the training completed by the teleworker.

The server 7 receives the information notified from the training system 2 in a step 4002, and updates the training information in a step 4003. More particularly, the training information stored in the information (history of received training) 606 related to the corresponding individual skill information within the individual skill information storage section 709 is deleted, and the training information is stored in the history of received training (completed training), in a step 4003. The server 7 also refers to the integrated level storage section 707 and updates the integrated level information 601 if the integrated level has become higher. In addition, the server 7 deletes the corresponding date and time information stored in the anticipated date information 602. Therefore, the individual skill information is updated by the step 4003 as shown in FIG. 21. FIG. 21 is a diagram showing the updated information stored in the individual skill information storage section 709.

When the updating of the training information ends, the server 7 refers to the personal basic information storage section 716 to extract an electronic mail address corresponding to the ID, and sends a notification indicating the completion of the training by the teleworker to the extracted electronic mail address, in a step 4004.

Figure 22:
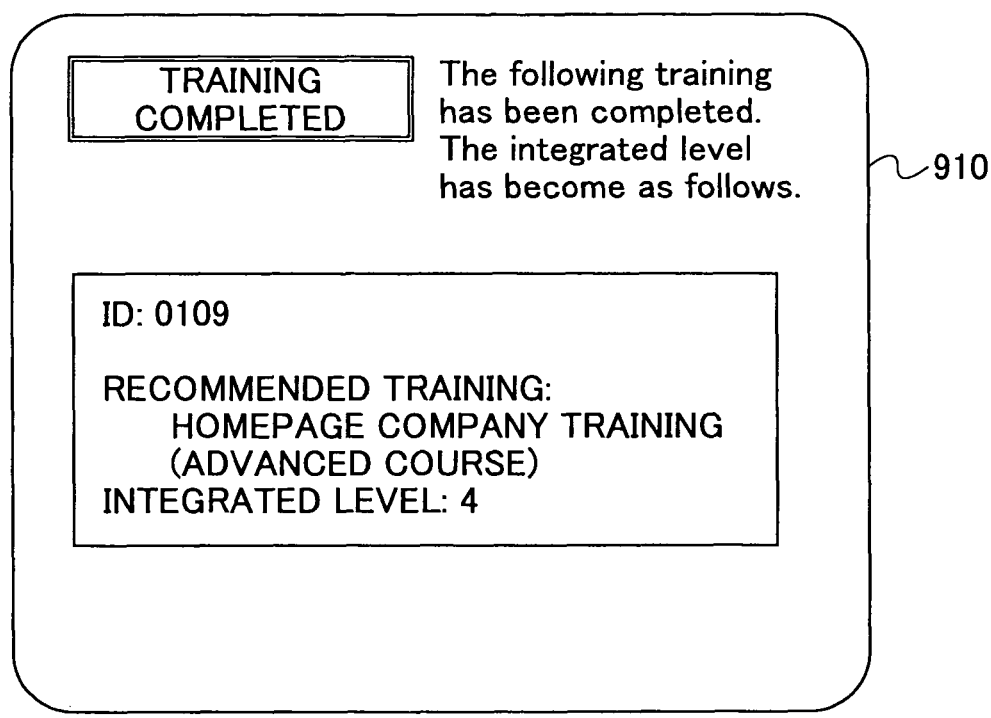
FIG. 22 is a diagram showing a display of a screen indicating completion of the training.

The teleworker terminal 6 receives from the server 7 the notification indicating the completion of the training by the teleworker, in a step 4005. In addition, the teleworker terminal 6 displays the received information in a screen 910 shown in FIG. 22, in a step 4006. FIG. 22 is a diagram showing a display of the screen 910 indicating the completion of the training by the teleworker.

Accordingly, when the training is completed by the teleworker, this information is automatically registered in the server 7, without the need for the teleworker to input this information. Moreover, the information related to the integrated level and the like, which affect the unit price of work, is also updated automatically.

[Teleworker Selecting Process]

Figure 23:
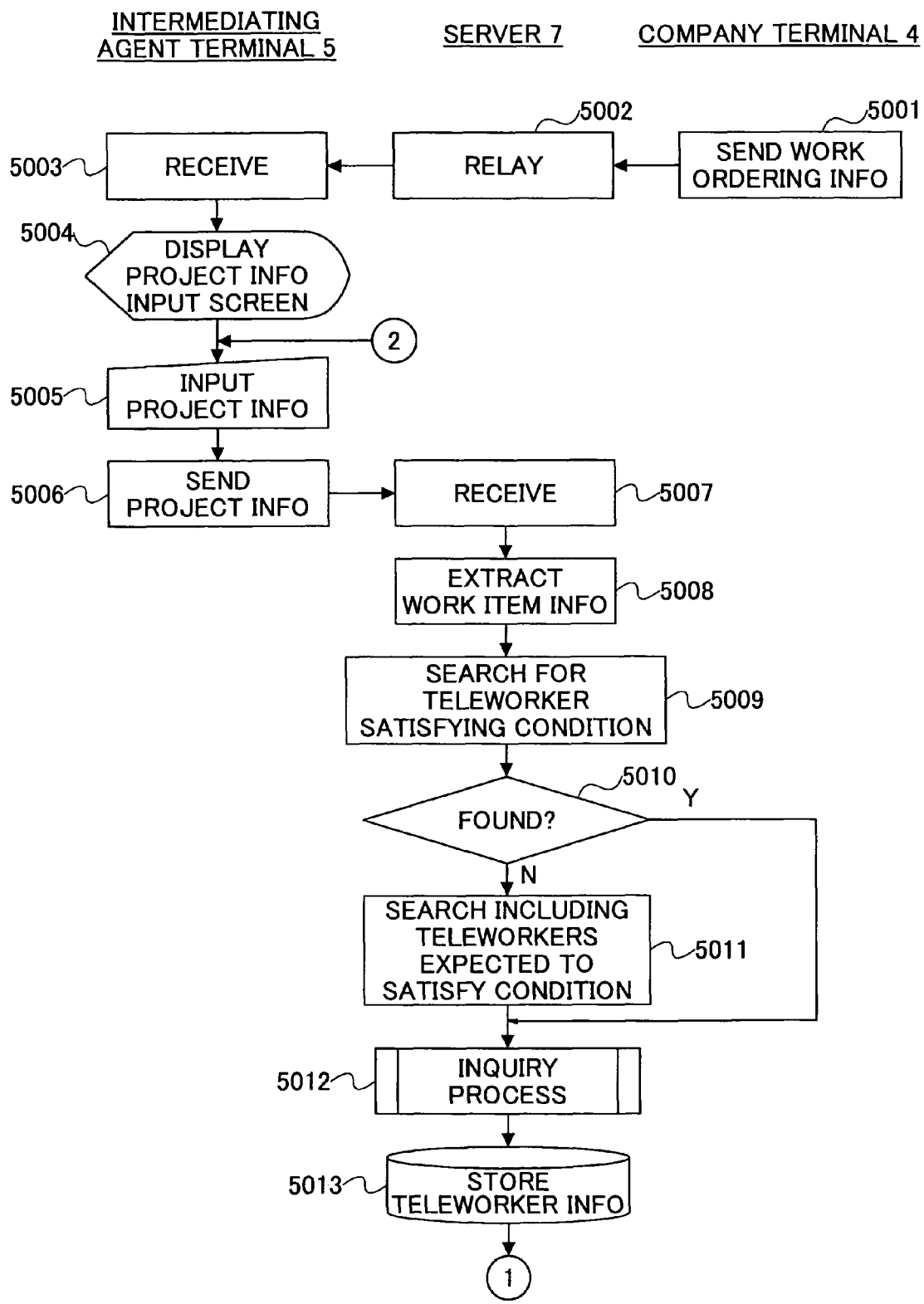
FIG. 23 is a flow chart for explaining a teleworker selecting process.

Next, a description will be given of a teleworker selecting process which is carried out by the person in charge of placing work order to the teleworkers at the ordering company that owns the company terminal 4, by referring to FIG. 23. This person in charge operates the company terminal 4 to place the work order with respect to the server 7 which registers and updates the information related to the teleworkers. FIG. 23 is a flow chart for explaining the teleworker selecting process. In FIG. 23, it is assumed for the sake of convenience that the processes of the server 7 related to the communication with the company terminal 5 are carried out by the project accepting section 702, the processes of the server 7 related to the actual teleworker selecting process are carried out by the teleworker selecting section 703, and the communication with other terminals and servers is made by the communicating section 713 via the communication network 1.

First, when the person in charge operates the company terminal 4 to select the teleworker to which the work order is to be placed, an ordering screen 911 shown in FIG. 24A is displayed on the company terminal 4. FIG. 24A is a diagram showing a display of the ordering screen 911 for placing the work order to the teleworker. As shown in FIG. 24A, the ordering screen 911 includes input fields to input information related to a company ID, a project name, a desired delivery date, a desired price, a priority order, and a backup which will be described later. The priority order indicates the order of priority of the conditions, that is, the desired delivery date and the desired price. The ordering screen 911 also includes a "send" button which is selected when sending the work order information to the server 7.

When the person in charge inputs the work ordering information into the input fields of the ordering screen 911 shown in FIG. 24A, an ordering screen 912 shown in FIG. 24B is displayed on the company terminal 4. FIG. 24B is a diagram showing a display of the ordering screen 912 after the ordering information is input on the ordering screen 911. In this particular case, (1) the desired delivery date has a higher priority than (2) the desired price, because "(1)→(2)" is input to the input field of the priority order.

The field to input the backup indicates "YES" when the backup may be used, and "NO" when no backup may be used. In a case where the selected teleworker cannot complete the work by the desired delivery date due to some reason but the selected teleworker is permitted to receive assistance from an alternate teleworker or to have the alternate teleworker take over and continue the work so as to meet the desired delivery date, the person in charge indicates in the ordering information that the backup may be used.

The teleworker is different from a normal employee of a company, such as the employee of the ordering company that owns the company terminal 4, and it is difficult to positively bind the work hours of the teleworker. In addition, in the work support system shown in FIG. 1, the ordering company may wish to use a teleworker at a remote location. In this situation, it is difficult for the ordering company or the intermediating agent to confirm the progress of the work order to the teleworker at the remote location. For these reasons, it may be regarded that the probability of meeting the desired delivery date is poorer when the teleworker performs the work, compared to the case where the employee of the ordering company performs the work. The backup is used to prevent such inconveniences and ensure that the delivery date is met.

The alternate teleworker, who assists or takes over from the originally selected teleworker, basically does not work unless the work performed by the originally selected teleworker is delayed. But since the alternate teleworker cannot perform other work during a time the backup may be required, that is, during a time when the originally selected teleworker performs the work, it is necessary to pay the alternate teleworker who stands by for the possible backup. However, from the point of view of the ordering company, it is unreasonable to pay the fees for two teleworkers, that is, twice the normal fees, with respect to a single work item. For this reason, this embodiment increases the normal fees by 20% when the backup may be used, which is more reasonable for the ordering company. On the other hand, the alternate teleworker is guaranteed at least 20% of the normal fees for standing by as the backup, regardless of whether the alternate teleworker assists or takes over from the originally selected teleworker. The information necessary to calculate the fees for the originally selected teleworker and the alternate teleworker for the case where the backup may be used, is managed by the server 7, and the work order from the company terminal 4 is sent to the teleworker terminal 6 or the intermediating agent terminal 5 based on the managed information.

Accordingly, it is possible to place a work order for the work which will positively be delivered by the delivery date at a cost which is considerably lower than the fees for using two teleworkers for a single work item, even when the alternate teleworker is used for the backup. As a result, the use of the backup provides a kind of "insurance" with respect to the work order to teleworkers, thereby making it safer and more reliable to place work orders to the teleworkers.

In addition, the alternate teleworker is guaranteed at least 20% of the normal fees for standing by as the backup, even when the alternate teleworker actually does not assist or take over from the originally selected teleworker. Consequently, although the 20% of the normal fees may sound low, it may be regarded that the alternate teleworker is unlikely to refuse accepting the backup work. Therefore, the ordering company or the intermediating agent can easily and smoothly place the work order to the teleworkers using the backup.

When the person in charge selects the "send" button on the ordering screen 912 shown in FIG. 24B after inputting the work ordering information, the company terminal 4 sends the input work ordering information to the server 7 in a step 5001 shown in FIG. 23. FIG. 23 shows the teleworker selecting process for a case where the intermediating agent is used.

The server 7 receives the work ordering information from the company terminal 4, and relays the work ordering information to the intermediating agent terminal 5 which is owned by the intermediating agent who intermediates between the ordering company and the teleworkers, in a step 5002.

Figure 25A:
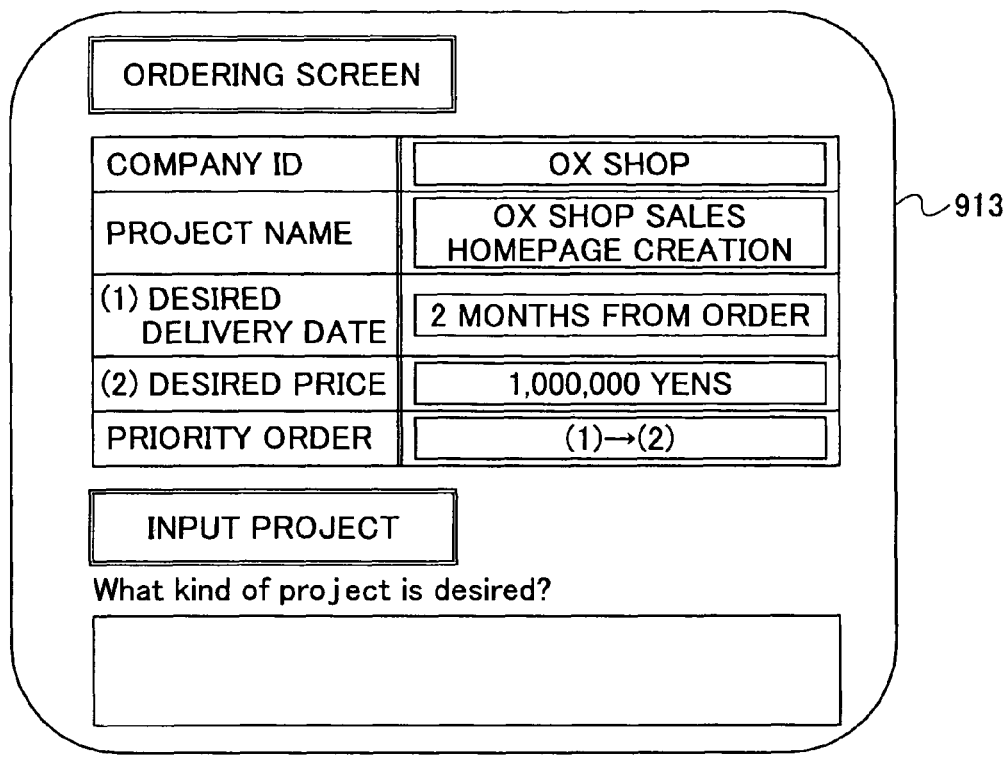
FIGS. 25A and 25B are diagrams showing displays of project information input screens for ordering teleworker work from an intermediating agent.

The intermediating agent terminal 5 receives the work ordering information relayed from the server 7 in a step 5003, and displays a project information input screen 913 shown in FIG. 25A in a step 5004. FIG. 25A is a diagram showing the project information input screen 913 for ordering teleworker work from the intermediating agent. As shown in FIG. 25A, the work ordering information related to the ordering company ID, the project name, the desired delivery date, the desired price and the priority order, and an input field to input the project are displayed on the project information input screen 913.

Figure 25B:
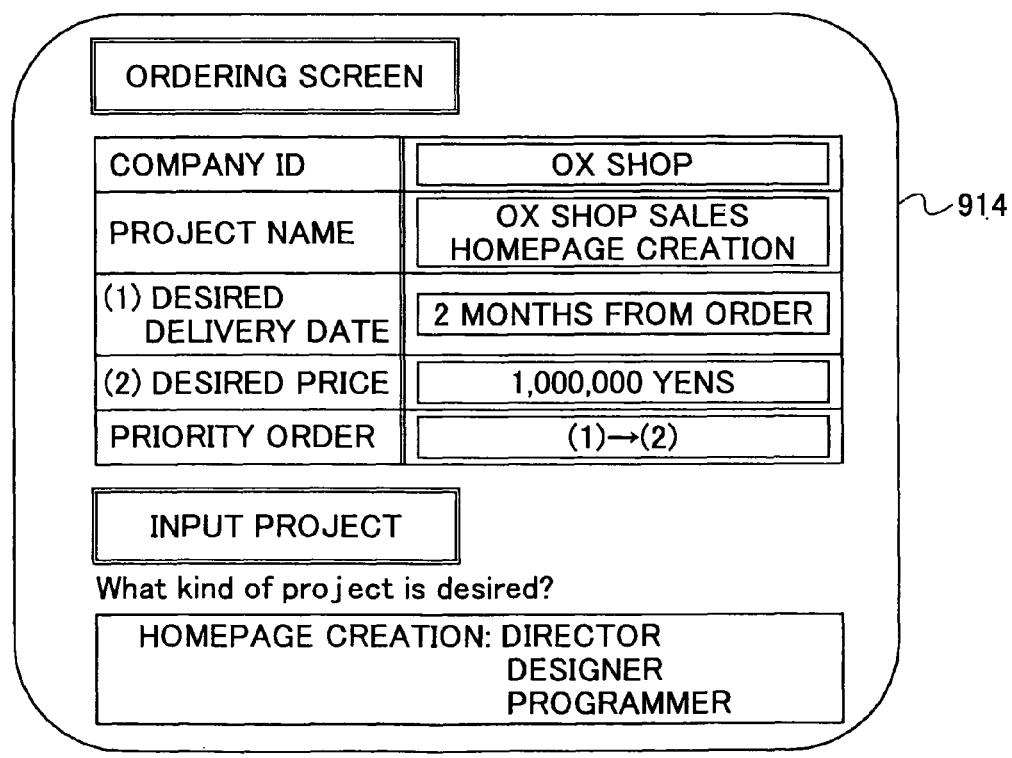

The intermediating agent considers the work and inputs the project information on the project information input screen 913 by operating the intermediating agent terminal 5 in a step 5005. As a result, a project information input screen 914 shown in FIG. 25B is displayed. FIG. 25B is a diagram showing the project information input screen 914 which is input with the various project information. Since the work in this embodiment relates to creating the homepage, the input field to input the project in the project information input screen 914 is input with "director", "designer" and "programmer", to indicate that the project is made up of three projects.

After the project information is input, when the intermediating agent operates the intermediating agent terminal 5 to send the input project information, the intermediating agent terminal 5 sends the input project information to the server 7 in a step 5006.

The server 7 receives the input project information from the intermediating agent terminal 5 in a step 5007. In addition, the server 7 extracts from the work item information storage section 704 the work item information corresponding to each received project information, in a step 5008.

After setting the time of each work process from the start of each project, by setting the starting year, month and day and the ending year, month and day, for example, the server 7 refers to the acquiring skill level storage section 705, the delivery rank information storage section 706, the integrated level information storage section 707, and the individual schedule information storage section 710, and to search for a teleworker who satisfies a certain condition, in a step 5009. In this case, the teleworker whose schedule is free during the time when each work process of the projects is to be performed, and simultaneously satisfies both the "desired delivery date" and "desired price" included in the received project information, satisfies the certain condition.

As described above, the unit price of each teleworker (unit price charged by each teleworker) is determined by the integrated level of the teleworker for the work item. Hence, if the cost is to be suppressed to a low value but the time to the date of delivery is relatively long, a combination of the teleworkers having a relatively low integrated level may be selected from the integrated level information storage section 707.

On the other hand, if the time to the date of delivery is relatively short and the cost is set to a high value, a combination of the teleworkers who can meet the date of delivery with a high reliability and even cope with early delivery before the desired date of delivery, may be selected from the integrated level information storage section 707. For example, if the delivery rank 301 is set in the delivery rank information storage section 706 as shown in FIG. 4, a combination of the teleworkers having the delivery rank 301 greater than or equal to "3" may be selected with priority over other teleworkers, so as to be able to cope with early delivery before the desired date of delivery.

Of course, other searches for the teleworkers satisfying the certain condition may be made to find an optimum teleworker combination.

In a case where the teleworkers cannot meet the desired price or the desired date of delivery, the server 7 refers to the priority order information included in the received project information, and confirms whether the desired price or the desired date of delivery is to have the priority over the other. In this embodiment, the desired date of delivery has the priority over the desired price as may be seen from the ordering screen 912 shown in FIG. 24B, and for this reason, the teleworker combination which can meet the desired date of delivery is searched even if the price becomes higher than the desired price. On the other hand, if the desired price has the priority over the desired date of delivery, the teleworker combination which can meet the desired price is searched even if the date of delivery becomes later than the desired date of delivery.

The server 7 decides whether or not the teleworker combination satisfying the certain condition is found, in a step 5010. If the decision result in the step 5010 is YES, the process advances to a step 5012 which will be described later.

If neither the desired price nor the desired delivery date cannot be met and the decision result in the step 5010 is NO, even after the search described above, the process advances to a step 5011. In the step 5011, the server 7 performs the search, by including in the search the teleworker who has not yet reached the desired delivery rank at the present but is expected to be able to perform the work with respect to the work item after receiving the training during the work period. More particularly, the server 7 makes a reference to the individual skill information of each teleworker, by referring to the individual skill information storage section 709. Since the individual skill information includes the scheduled end date when the training will be completed as described above in conjunction with FIG. 18, it may be assumed that the teleworker will have the improved delivery rank after the scheduled end date. Hence, the search is made by including the teleworker who will have the desired delivery rank which satisfies the certain condition after the scheduled end date. The process advances to the step 5012 after the step 5011.

In this embodiment, the search including the teleworker who is expected to complete the training required to achieve the desired delivery rank is made after making the search excluding the teleworker who is expected to complete the training. This is to more positively ensure the delivery of the work, because the training of the teleworker may be delayed, and the teleworker immediately after achieving the desired delivery rank is still not as experienced as the teleworker who originally has the desired delivery rank.

When the search for the teleworker combination by the server 7 is completed and the teleworker combination to perform the work with respect to each work item is determined, the teleworker information is stored in the temporary storage section 712. FIG. 26 is a diagram showing tables 1210, 1220 and 1230 of the teleworker information stored in the temporary storage section 712. The table 1210 stores the teleworker information related to the director, the table 1220 includes the teleworker information related to the designer, and the table 1230 includes the teleworker information related to the programmer.

As shown in FIG. 26, each of the tables 1210, 1220 and 1230 stores a work item 1201, a teleworker ID 1202 of the teleworker to perform the work, and a processing time 1204. A backup teleworker 1203 is not yet stored in the tables 1210, 1220 and 1230 at this stage.

Figure 27:
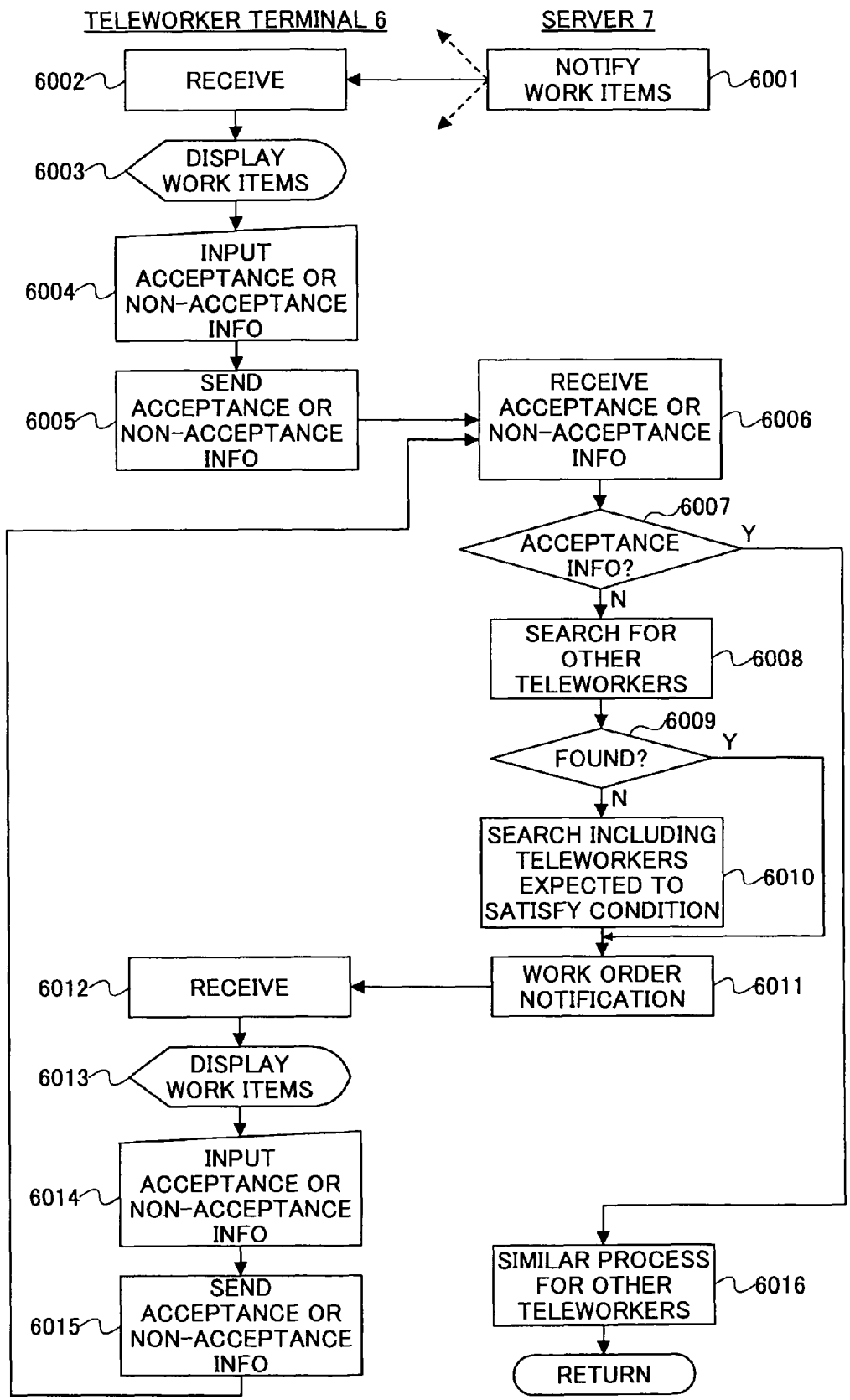
FIG. 27 is a flow chart for explaining a procedure for performing an inquiry process.

Thereafter, the server 7 makes an inquiry process to inquire the teleworker terminal 6 whether or not the work can be performed, in a step 5012. This inquiry process may be performed as shown in FIG. 27. FIG. 27 is a flow chart for explaining a procedure for performing this inquiry process.

In a step 6001 shown in FIG. 27, the server 7 notifies the work items, that is, the work contents, to the teleworker terminal 6 of each teleworker who is selected and stored in the temporary storage section 712.

The teleworker terminal 6 receives the work items from the server 7 in a step 6002, and displays the received work items on a work order accepting screen 915 shown in FIG. 28, in a step 6003. FIG. 28 is a diagram showing a display of the work order accepting screen 915 on the teleworker terminal 6.

The teleworker operates the teleworker terminal 6 to input information indicating whether or not the teleworker will accept the work order, in a step 6004. In this particular case, a "YES" button on the work order accepting screen 915 is selected when accepting the work order, and a "NO" button is selected when not accepting the work order. Then, the teleworker terminal 6 sends the information indicating whether or not the teleworker will accept the work order, to the server 7, in a step 6005.

The server 7 receives from the teleworker terminal 6 the information indicating whether or not the teleworker will accepts the work order, in a step 6006. Then, the server 7 decides whether or not the received information indicates that the teleworker will accept the work order, in a step 6007. The process advances to a step 6016 which will be described later if the decision result in the step 6007 is YES. On the other hand, if the decision result in the step 6007 is NO, the server 7 searches for another teleworker other than the teleworker who sent the information indicating that the teleworker cannot accept the work order, in a step 6008. More particularly, the step 6008 refers to the individual skill information storage section 709, the individual schedule information storage section 710 and the project information storage section 711, and searches for the other teleworker satisfying a predetermined condition, that is, the other teleworker whose schedule is free during the time the work items were scheduled to be performed by the teleworker who could not accept the work order and has a technical skill level comparable to that of the teleworker who could not accept the work order.

The server 7 decides whether or not the other teleworker satisfying the predetermined condition is found. If the decision result in the step 6009 is NO, the server 7 performs a search in a step 6010 by including in the search the teleworker who has not yet reached the desired delivery rank at the present but is expected to be able to perform the work with respect to the work item after receiving the training during the work period, similarly to the step 5011 shown in FIG. 23.

The process advances to a step 6011 if the decision result in the step 6009 is YES or after the step 6010. The server 7 makes a work order notification with respect to the teleworker terminal 6 of the teleworker who is newly selected by the above described procedure, in the step 6011.

The work order notification from the server 7 is processed in steps 6012 through 6014 by the teleworker terminal 6 of the teleworker who is newly selected, similarly to the steps 6002 through 6004 described above. In addition, the teleworker terminal 6 sends information indicating whether or not the teleworker will accept the work order, to the server 7, in a step 6015.

In response to the information received from the teleworker terminal 6, the server 7 repeats the processes of the steps 6006 through 6011 until the decision result in the step 6007 becomes YES. If the decision result in the step 6007 is YES, the server 7 updates the teleworker ID of the corresponding work item in the temporary storage section 712 to the teleworker ID of the teleworker terminal 6 (or teleworker) from which the information indicating that the teleworker will accept the work order is received, and thereafter performs processes similar to those described above with respect to the other teleworkers in a step 6016. The procedure shown in FIG. 27 ends when the teleworkers for all work items are determined.

By completing the above-described procedure shown in FIG. 27, the teleworker IDs (teleworker information) of the teleworkers who are determined to perform the accepted work order are stored in the temporary storage section 712 for each work item, and this teleworker information is stored in the project information storage section 711 in a step 5013 shown in FIG. 23.

Figure 29:
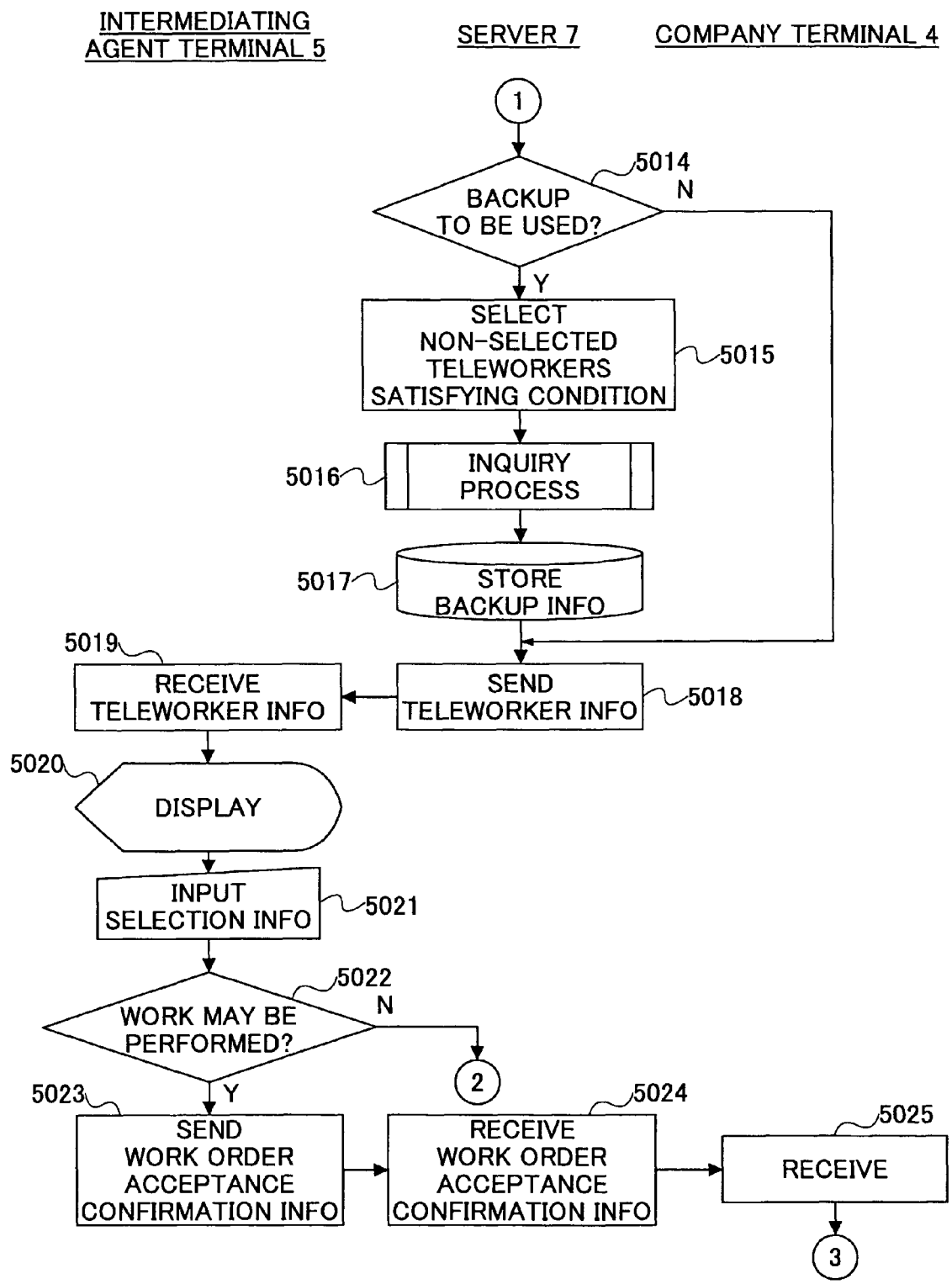
FIG. 29 is a flow chart for explaining the teleworker selecting process.

Next, the server 7 refers to the information which is included in the project information received from the intermediating agent terminal 4 and indicates whether or not the backup may be used, and decides whether or not the backup is to be used in a step 5014 shown in FIG. 29. FIG. 29 is a flow chart for explaining the teleworker selecting process. The step 5014 shown in FIG. 29 is carried out after the step 5013 shown in FIG. 23.

If the decision result in the step 5014 is NO, the server 7 does not perform the processes for using the backup, and the process advances to a step 5018 which will be described later. On the other hand, if the decision result in the step 5014 is YES, the server 7 selects from the teleworkers having the teleworker information not stored in the temporary storage section 712, that is, the teleworkers who have not yet been selected, the teleworker having a technical skill level comparable to or higher than that of the teleworker who accepted the work order, with respect to each selected work item, in a step 5015. The selection of the teleworker in the step 5015 may be carried out similarly to the step 5009 shown in FIG. 23 described above which selects the teleworker satisfying the certain condition, and a description thereof will be omitted.

The server 7 makes an inquiry process to inquire the teleworker terminal 6 whether or not the work can be performed, in a step 5016. The inquiry process of the step 5016 may be performed similarly to the step 5012 shown in FIG. 23, that is, the steps 6001 through 6016 shown in FIG. 27, except for the following two points.

Figure 30:
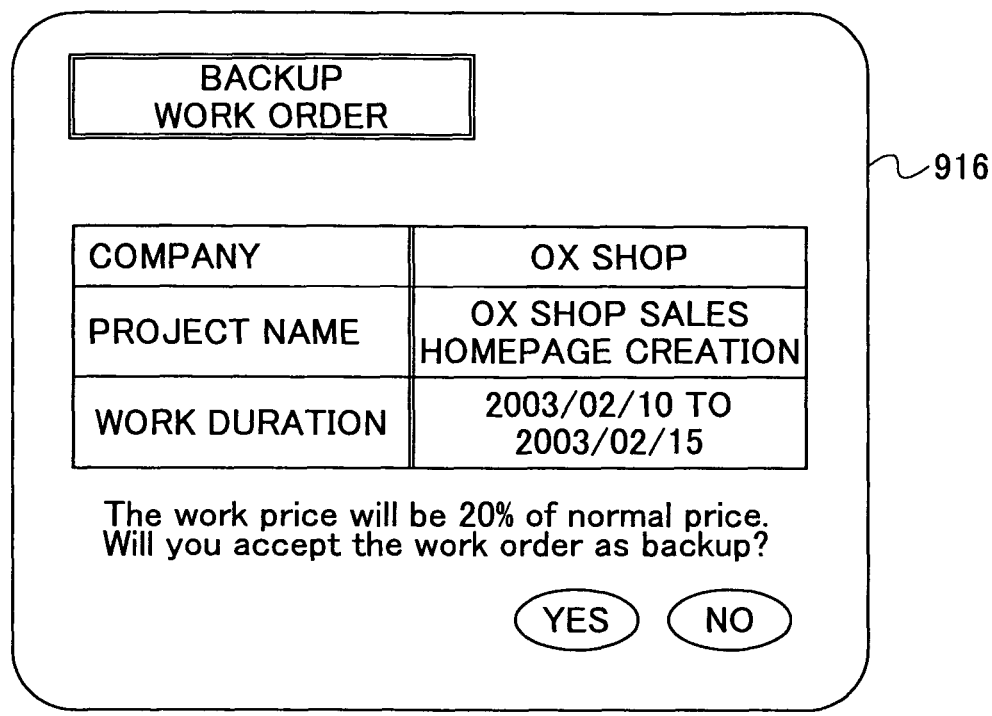
FIG. 30 is a diagram showing a display of a backup work order screen on a server.

First, in the case of the step 5016, the information which is sent in the step 6011, that is, the information displayed in the step 6013, is different from that of the step 5012. In the case of the step 5016, a backup work order screen 916 shown in FIG. 30 is displayed on the server 7. FIG. 30 is a diagram showing a display of the backup work order screen 916. As described above, the alternate (or backup) teleworker is guaranteed at least 20% of the normal fees for standing by as the backup, regardless of whether the alternate teleworker assists or takes over from the originally selected teleworker. The backup work order screen 916 includes information indicating whether or not the alternate teleworker accepts the backup work order. In the backup work order screen 916, a "YES" button is selected when accepting the backup work order, and a "NO" button is selected when not accepting the backup work order.

Second, when the alternate teleworker accepts the backup work order, the step 5016 updates the teleworker ID, but in the case of the step 5012, the teleworker ID is stored in the backup teleworker 1203.

After the step 5016 is completed, the server 7 stores the corresponding teleworker information in the teleworker ID 1202 of the teleworker to perform the work and the backup teleworker 1203 of the tables 1210, 1220 and 1230 of the teleworker information stored in the temporary storage section 712, as shown in FIG. 31. Based on the information shown in FIG. 31, the server 7 updates or replaces the information stored in the project information storage section 711 in the step 5013 as shown in FIG. 31, in a step 5017. FIG. 31 is a diagram showing the information stored in the project information storage section 711.

After the process of the step 5017 is completed, the server 7 sends information such as the determined teleworkers, price, date of delivery and the like to the intermediating agent terminal 5 in a step 5018.

The intermediating agent terminal 5 receives the information, such as the determined teleworkers, price and date of delivery, from the server 7, in a step 5019. Then, the intermediating agent terminal 5 displays a teleworker selection screen 917 shown in FIG. 32, in a step 5020. FIG. 32 is a diagram showing a display of the teleworker selection screen 917 on the intermediating agent terminal 5. The teleworker selection screen 917 includes a total work time, a total price and a backup price (price of backup), as well as information indicating the teleworkers who are to perform each work item. In this particular case, one teleworker selection screen 917 is prepared for each work item, and the intermediating agent operates the intermediating agent terminal 5 to switch the teleworker selection screen 917 for each work item, so as to confirm the contents of the selected teleworkers. However, if the size of the display permits, one teleworker selection screen may be displayed for a plurality of work items, so that the contents of the selected teleworkers can be confirmed simultaneously for a plurality of work items.

In this embodiment, there is only one final teleworker selection pattern. However, it is possible to select the teleworkers with a plurality of teleworker selection patterns, and finally select one of the plurality of teleworker selection patterns on the teleworker selection screen 917.

The intermediating agent operates the intermediating agent terminal 5 to input selection information indicating whether or not the work may be performed under the condition displayed on the teleworker selection screen 917, in a step 5021. In this particular case, an "execute" button on the teleworker selection screen 917 is selected when permitting the work, and a "cancel" button is selected when not permitting the work. The intermediating agent terminal 5 decides whether or not the input selection information indicates that the work may be performed under the condition displayed on the teleworker selection screen 917, in a step 5022. The process returns to the step 6006 shown in FIG. 23 if the decision result in the step 5022 is NO, so as to set the condition over again. On the other hand, if the decision result in the step 5022 is YES, the intermediating agent terminal 5 sends confirmation information indicating that the work may be performed under the condition displayed on the teleworker selection screen 917, that is, the work order acceptance confirmation information, to the server 7, in a step 5023.

The server 7 receives the work order acceptance confirmation information from the intermediating agent terminal 5, and sends work order acceptance information indicating acceptance of the work order for the project to the company terminal 4, in a step 5024.

Figure 33:
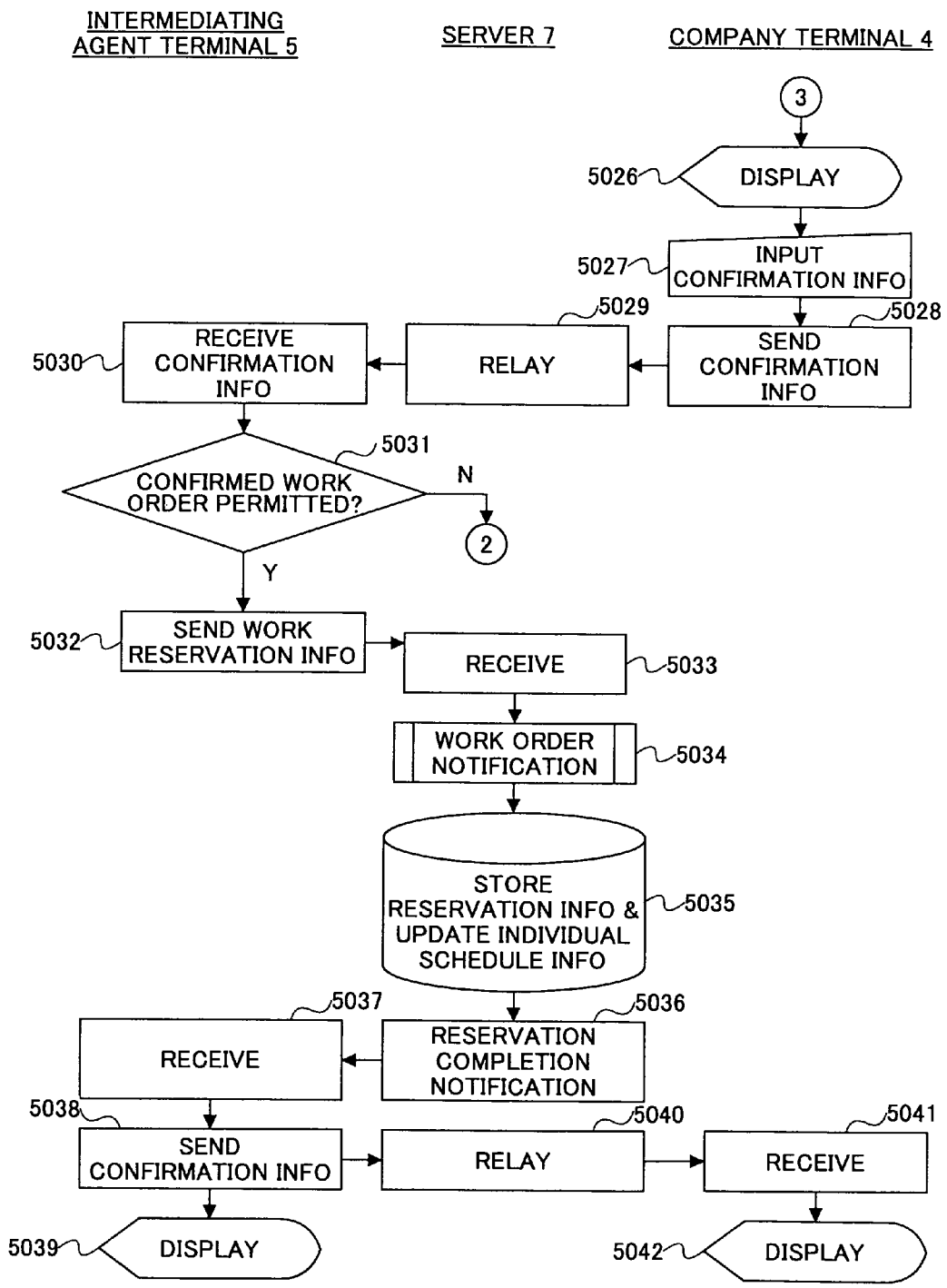
FIG. 33 is a flow chart for explaining a teleworker selection process.

The company terminal 4 receives the work order acceptance information from the server 7 in a step 5025, and the process advances to a step 5026 shown in FIG. 33. FIG. 33 is a flowchart for explaining a teleworker selection process.

Figure 34:
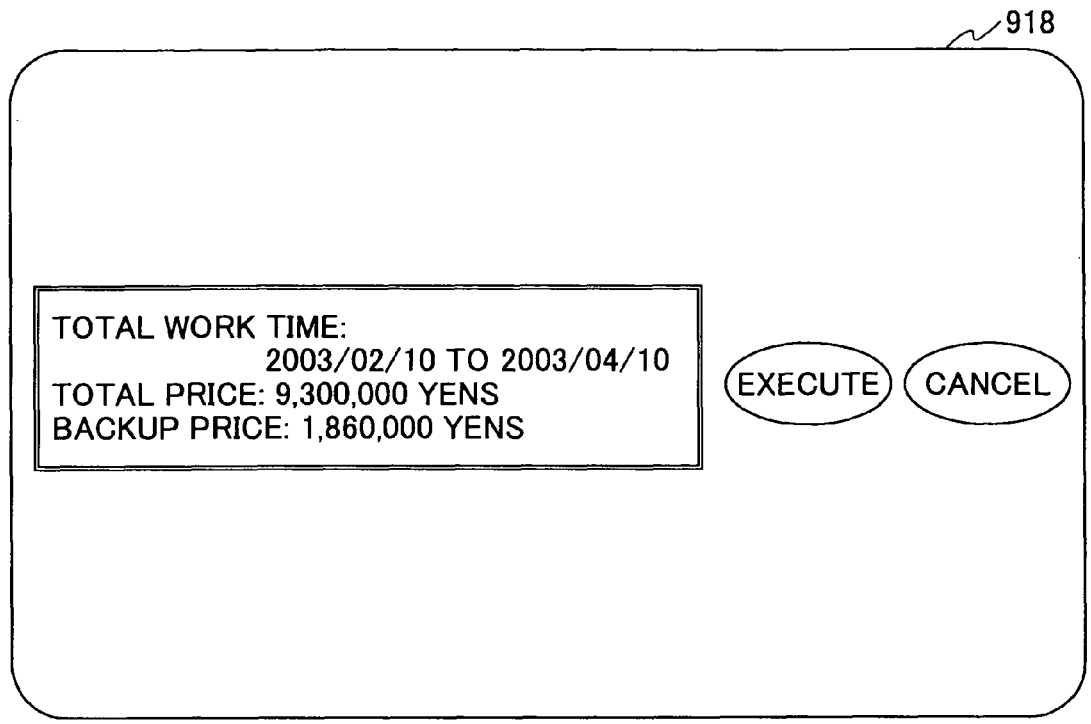
FIG. 34 is a diagram showing a display of a work order acceptance confirmation screen on a company terminal.

In FIG. 33, the company terminal 4 displays the received work order acceptance information on a work order acceptance confirmation screen 918 shown in FIG. 34. FIG. 34 is a diagram showing a display of the work order acceptance confirmation screen 918 on the company terminal 4. The teleworker information is displayed on the intermediating agent terminal 4, but the teleworker information is not the most important information for the ordering company that places the work order. Hence, as shown in FIG. 34, the work order acceptance confirmation screen 918 includes information other than the teleworker information, so as to facilitate confirmation of the acceptance of the work order.

The person in charge at the ordering company operates the company terminal 4 while inspecting the information displayed on the work order acceptance confirmation screen 918, and inputs confirmation information indicating whether or not to permit the confirmed work order, in a step 5027. In this particular case, an "execute" button on the work order acceptance confirmation screen 918 is selected when permitting the confirmed work order, and a "cancel" button is selected when not permitting the confirmed work order. The company terminal 4 sends the confirmation information to the server 7, in a step 5028.

The server 7 receives the confirmation information from the company terminal 4, and relays the confirmation information to the intermediating agent terminal 5, in a step 5029.

The intermediating agent terminal 5 receives the confirmation information relayed via the server 7, in a step 5030. In addition, the intermediating agent terminal 5 decides whether or not the confirmation information indicates that the confirmed work order is permitted, in a step 5031. The process returns to the step 5005 shown in FIG. 23 if the decision result in the step 5031 is NO, so as to perform the teleworker selecting process over again under another condition. On the other hand, if the decision result in the step 5031 is YES, the intermediating agent terminal 5 sends work reservation information to the server 7, in a step 5032. The work reservation information indicates that the work related to the project is formally reserved.

The server 7 receives the work reservation information from the intermediating agent terminal 5, in a step 5033. Furthermore, the server 7 performs a work order notification with respect to the teleworker terminal 5, in a step 5034.

Figure 35:
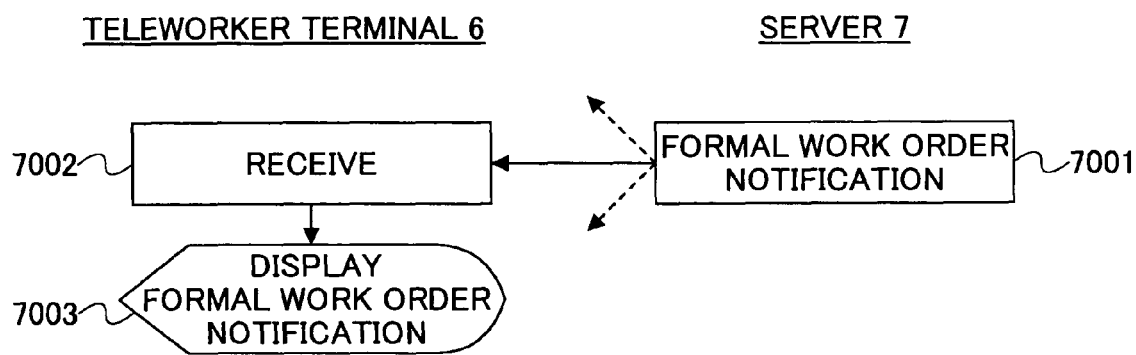
FIG. 35 is a flow chart for explaining a teleworker notifying process.

FIG. 35 is a flow chart for explaining a teleworker notifying process performed by the step 5034 shown in FIG. 33. In FIG. 35, the server 7 makes a formal work order notification with respect to the teleworker terminal 6 of each selected teleworker, in a step 7001. The teleworker terminal 6 receives the formal work order notification from the server 7 in a step 7002, and displays the formal work order notification in a step 7003. Hence, each selected teleworker can recognize from the formal work order notification displayed on the teleworker terminal 6 that a formal work order has been received.

Then, the server 7 refers to the project information stored in the project information storage section 711, and updates each individual schedule information stored in the individual schedule information storage section 710 depending on the project information, in a step 5035. Thereafter, the server 7 sends a reservation completion notification, indicating the completion of the reservation process to reserve the work, to the intermediating agent terminal 5, in a step 5036.

The intermediating agent terminal 5 receives the reservation completion notification from the server 7 in a step 5037, and sends confirmation information, indicating that the reservation completion has been confirmed, to the server 7, in a step 5038. The intermediating agent terminal 5 displays the confirmation information in a step 5039.

In addition, the server 7 receives the confirmation information sent from the intermediating agent terminal 6 in the step 5038, and relays the received confirmation information to the company terminal 4, in a step 5040.

The company terminal 4 receives the confirmation information relayed via the server 7, in a step 5041. Moreover, the company terminal 4 displays the received confirmation information in a step 5042.

In this embodiment, the integrated level is judged from two elements, namely, the "delivery rank" and the "technical skill level", so as to obtain the unit price information. However, if is possible to judge the integrated level from more detailed elements. For example, a rank may be set with respect to skills including "delivery meeting percentage", "customer evaluation", "acquired certificates", "received training" and "past achievements", so that the integrated level may be determined from a combination of such elements (skills). It is desirable that the "customer evaluation" in particular is further divided into more detailed elements such as "quality of creation", "communication" and "total evaluation", so as to enable more detailed determination of the rank.

In addition, the embodiment described above selects a target teleworker using the skill and the schedule of the individual teleworker. However, the target teleworker may be selected based on further information, such as information indicating whether or not the teleworker can travel from his home to a remote location for consultation and/or work, and information indicating the priority of work to be performed depending on a handicap in the case of a handicapped teleworker. For example, this information indicating the priority of the work to be performed depending on the handicap, indicates that the work which enables consultation in a barrier-free building is to be selected with priority over others in the case of a handicapped teleworker using a wheelchair.

Moreover, although the embodiment described above sets the selection and the processing time of the teleworker depending only on the kind of work, the precondition of the work and the like greatly affects the amount of work. For example, in the case of the work to create the homepage, the amount of work greatly varies depending on the number of pages to be provided by the homepage, and the functions required by the homepage. The functions required by the homepage may include functions of using an object-oriented language, creating the homepage using a simple language such as HTML, and including a dynamic image (or animation) or a photograph image, for example. Therefore, by taking into consideration the amount of work when actually placing the work order, it is possible to more positively have the teleworkers perform the work.

Further, the present invention is not limited to these embodiments, but various variations and modifications may be made without departing from the scope of the present invention.

What is claimed is:

1. A work support method to be implemented in a computer, comprising:

first extracting by the computer, in response to receiving a work order, worker information related to a worker already having a skill capable of performing a work item with respect to the work order, based on information of the work item with respect to a work stored in a work item information storage unit and skill information of all workers stored in a skill information storage unit;

second extracting by the computer, when no worker information related to the worker already having the skill capable of performing each work item with respect to the work order is extractable for the work item as a result of said first extracting, worker information related to a worker who will have a skill capable of performing each work item with respect to the work order, by a time when each work item of the work order is performed, based on information related to the end date of the training of all workers stored in the skill information storage unit; and storing by the computer, data of the extracted worker with respect to each work item in the work item information storage unit.

2. The work support method as claimed in claim 1, wherein at least one of said first extracting and said second extracting extracts, by the computer, worker information of a first worker to actually perform each work item, and worker information of a second worker to assist the first worker, and stores the extracted work information of the first and second workers in a work information storage unit that is configured to store worker information related to a worker to be registered for each work item.

3. The work support method as claimed in claim 2, wherein at least one of said first extracting and said second extracting extracts, by the computer, worker information of the second worker having a skill comparable to that of the first worker, by referring to the information stored in the skill information storage unit.

4. The work support method as claimed in claim 1, further comprising:
    storing by the computer the skill information of workers and the information related to an end date of a training which is being received by each worker in the skill information storage unit;
    storing by the computer the information of each work item with respect to the work in the work item information storage unit; and
    storing by the computer worker information related to a worker to be registered for each work item in a work information storage unit.

5. A work support apparatus comprising:
    a skill information storage unit configured to store skill information of workers and information related to an end date of a training which is being received by each worker;
    a work item information storage unit configured to store work item information with respect to a work;
    a work information storage unit configured to store worker information related to a worker to be registered for each work item with respect to the work; and
    a processor comprising:
        a worker extracting unit configured to extract by a first extraction, in response to receiving a work order, worker information related to a worker already having a skill capable of performing a work item with respect to the work order, based on the information of the work item with respect to a work stored in the work item information storage unit and the skill information of all workers stored in the skill information storage unit, and to extract by a second extraction, when no worker information related to the worker already having the skill capable of performing each work item with respect to the work order is extractable for a work item as a result of the first extraction, worker information of a worker who will have a skill capable of performing the work item with respect to the work order, by a time the work item of the work order is to be performed, based on the information related to the end date of the training of all workers stored in the skill information storage unit; and
        a storing unit configured to store data of the extracted worker with respect to each work item in the work item information storage unit.

6. The work support apparatus as claimed in claim 5, wherein said worker extracting unit extracts, by at least one of said first extraction and said second extraction, worker information related to a first worker to actually perform each work item, and worker information related to a second worker to assist the first worker, and stores the extracted worker information of the first and second workers in the work information storage unit.

7. The work support apparatus as claimed in claim 6, wherein said worker extracting unit extracts, by at least one of said first extraction and said second extraction, worker information of the second worker having a skill comparable to that of the first worker, by referring to the information stored in the skill information storage unit.

8. A non-transitory computer-readable storage medium that stores a work support program which, when executed by a computer, causes the computer to execute a work support process, said work support process comprising:
    first extracting causing the computer to extract, in response to receiving a work order, worker information related to a worker already having a skill capable of performing a work item with respect to the work order, based on information of the work item with respect to a work stored in a work item information storage unit and skill information of all workers stored in a skill information storage unit;
    second extracting causing the computer to extract, if no worker information related to the worker already having the skill capable of performing each work item with respect to the work order is extractable for a work item as a result of said first extracting, worker information related to a worker who will have a skill capable of performing each work item with respect to the work order, by a time when each work item of the work order is performed, based on information related to the end date of the training of all workers stored in the skill information storage unit; and
    storing causing the computer to store data of the extracted worker with respect to each work item in the work item information storage unit.

9. The non-transitory computer-readable storage medium as claimed in claim 8, wherein at least one of said first extracting and said second extracting causes the computer to extract worker information related to a first worker to actually perform each work item, and worker information related to a second worker to assist the first worker, and to store the extracted worker information related to the first and second workers in a work information storage unit.

10. The non-transitory computer-readable storage medium as claimed in claim 9, wherein at least one of said first extracting and said second extracting causes the computer to extract worker information of the second worker having a skill comparable to that of the first worker, by referring to the information stored in the skill information storage unit.

11. The non-transitory computer-readable storage medium as claimed in claim 8, wherein said work support process further comprises:
    storing causing the computer to store the skill information of workers and the information related to an end date of a training which is being received by each worker in the skill information storage unit;
    storing causing the computer to store the information of each work item with respect to the work in the work item information storage unit; and
    storing causing the computer to store worker information related to a worker to be registered for each work item with respect to the work in a work information storage unit.

* * * * *